United States Patent
Maki et al.

(10) Patent No.: US 9,829,316 B2
(45) Date of Patent: Nov. 28, 2017

(54) DETECTION DEVICE, SENSOR, ELECTRONIC APPARATUS, AND MOVING OBJECT

(71) Applicant: Seiko Epson Corporation, Tokyo (JP)

(72) Inventors: Katsuhiko Maki, Chino (JP); Takashi Nomiya, Matsumoto (JP)

(73) Assignee: Seiko Epson Corporation (JP)

( * ) Notice: Subject to any disclaimer, the term of this patent is extended or adjusted under 35 U.S.C. 154(b) by 424 days.

(21) Appl. No.: 14/533,578

(22) Filed: Nov. 5, 2014

(65) Prior Publication Data

US 2015/0122022 A1 May 7, 2015

(30) Foreign Application Priority Data

Nov. 7, 2013 (JP) .................................. 2013-231341

(51) Int. Cl.
G01C 19/56 (2012.01)
G01C 19/00 (2013.01)
G01C 19/5614 (2012.01)
G01C 19/5776 (2012.01)

(52) U.S. Cl.
CPC ..... G01C 19/5614 (2013.01); G01C 19/5776 (2013.01)

(58) Field of Classification Search
None
See application file for complete search history.

(56) References Cited

U.S. PATENT DOCUMENTS

| 4,125,809 | A | * | 11/1978 | Mott | H04B 17/20 324/614 |
| 5,229,606 | A | * | 7/1993 | Elings | B82Y 35/00 250/307 |
| 7,895,894 | B2 | | 3/2011 | Kanai et al. | |
| 2001/0055350 | A1 | * | 12/2001 | Higure | H03G 3/3078 375/345 |
| 2009/0084180 | A1 | * | 4/2009 | Yoshida | G01F 1/8431 73/504.02 |

FOREIGN PATENT DOCUMENTS

JP 2008-139287 A 6/2008

* cited by examiner

*Primary Examiner* — Matthew G. Marini
*Assistant Examiner* — Ruben Parco, Jr.
(74) *Attorney, Agent, or Firm* — Harness, Dickey & Pierce, P.L.C.

(57) ABSTRACT

A detection device includes: a drive circuit which receives a feedback signal from a physical quantity transducer and drives the physical quantity transducer; a detection circuit which receives a detection signal from the physical quantity transducer and detects a desired signal; and a control unit which controls switching on/off of an AGC loop in the drive circuit. The drive circuit outputs a drive signal based on a control voltage that is set by the AGC loop in an on-period of the AGC loop to the physical quantity transducer and thus drives the physical quantity transducer in an off-period of the AGC loop.

13 Claims, 19 Drawing Sheets

ON/OFF TOGGLE OPERATION

FIG. 12A

| AGMODE[1:0] | CONTENT |
|---|---|
| 00 | AGC LOOP CONSTANTLY ON |
| 01 | AGC LOOP ON/OFF TOGGLE OPERATION |
| 10 | AGC LOOP CONSTANTLY OFF |
| 11 | AGC LOOP ON AT STARTUP, AGC LOOP OFF AFTER STARTUP COMPLETION |

FIG. 12B

| AGSTART[1:0] | CONTENT |
|---|---|
| 00 | SWITCH AGC LOOP OFF FROM ON 50 ms AFTER DRIVE CURRENT REACHES PREDETERMINED CURRENT |
| 01 | SWITCH AGC LOOP OFF FROM ON 100 ms AFTER DRIVE CURRENT REACHES PREDETERMINED CURRENT |
| 10 | SWITCH AGC LOOP OFF FROM ON 150 ms AFTER DRIVE CURRENT REACHES PREDETERMINED CURRENT |
| 11 | SWITCH AGC LOOP OFF FROM ON 200 ms AFTER DRIVE CURRENT REACHES PREDETERMINED CURRENT |

FIG. 12C

| AGOFTM[7:0] | AGC LOOP OFF TIME (CAN BE SET FROM 8h01 (100 ms) TO 8hff (25.5 S) ON 100 ms BASIS) |
|---|---|

FIG. 12D

| AGONTM[7:0] | AGC LOOP ON TIME (CAN BE SET FROM 8h00 (100 ms) TO 8hff (25.5 S) ON 100 ms BASIS) |
|---|---|

AGC LOOP ON-PERIOD

AGC LOOP OFF-PERIOD

DETECTION DEVICE, SENSOR, ELECTRONIC APPARATUS, AND MOVING OBJECT

BACKGROUND

1. Technical Field

The present invention relates to a detection device, a sensor, an electronic apparatus, and a moving object or the like.

2. Related Art

A gyro sensor for detecting a physical quantity that changes due to an external factor is incorporated in an electronic apparatus such as a digital camera or smartphone, or a moving object such as a vehicle or aircraft. Such a gyro sensor detects a physical quantity such as angular velocity and is used for so-called image stabilization, posture control, GPS autonomous navigation or the like.

As such a gyro sensor, an oscillation gyro sensor such as a quartz crystal piezoelectric oscillation gyro sensor is known. The oscillation gyro sensor detects a physical quantity corresponding to a Coriolis force generated by a rotation. As a detection device with such an oscillation gyro sensor, for example, the related-art technique disclosed in JP-A-2008-139287 is known.

In the related-art technique of JP-A-2008-139287, a sleep mode to realize low power consumption is prepared. However, according to JP-A-2008-139287, in the sleep mode, another oscillation loop than an oscillation by AGC is formed and an oscillator is driven by a drive signal generated using a comparator provided in the oscillation loop in question. In the driving by such a drive signal that does not involve AGC control at all, the function of keeping the drive current of the oscillator constant does not work and therefore a desired signal cannot be detected properly. Thus, while the sleep mode achieves reduction in power consumption, there is a problem that proper detection processing of a desired signal using the oscillator cannot be realized during the sleep mode period.

SUMMARY

An advantage of some aspects of the invention is that a detection device, a sensor, an electronic apparatus and a moving object or the like in which detection processing of a desired signal with high detection performance is realized by driving in an off-period of the AGC loop can be provided.

The invention can be realized as the following embodiments or aspects.

An aspect of the invention relates to a detection device including: a drive circuit which receives a feedback signal from a physical quantity transducer and drives the physical quantity transducer; a detection circuit which receives a detection signal from the physical quantity transducer and detects a desired signal; and a control unit which controls switching on/off of an AGC (automatic gain control) loop in the drive circuit. The drive circuit outputs a drive signal based on a control voltage that is set by the AGC loop in an on-period of the AGC loop to the physical quantity transducer and thus drives the physical quantity transducer in an off-period of the AGC loop.

According to this configuration, the switching on/off of the AGC loop in the drive circuit is controlled by the control unit. A drive signal based on a control voltage that is set by the AGC loop in an on-period of the AGC loop is outputted in an off-period of the AGC loop, thereby driving the physical quantity transducer. Thus, in the off-period of the AGC loop, which is considered to have less noise, the physical quantity transducer is driven by the drive signal based on the setting in the on-period of the AGC loop, thereby enabling execution of detection processing of a desired signal. Therefore, compared with the case where detection processing is carried out only by the driving during the on-period of the AGC loop, detection processing of a desired signal with high detection performance can be realized.

Another aspect of the invention relates to a detection device including: a drive circuit which receives a feedback signal from a physical quantity transducer, forms an oscillation loops with the physical quantity transducer, includes an AGC (automatic gain control) loop to control gain of the oscillation loop, and drives the physical quantity transducer; a detection circuit which receives a detection signal from the physical quantity transducer and detects a desired signal; and a control unit which controls switching on/off of the AGC loop in the drive circuit. The drive circuit outputs a drive signal based on a control voltage that is set by the AGC loop in an on-period of the AGC loop to the physical quantity transducer and thus drives the physical quantity transducer in an off-period of the AGC loop.

According to this configuration, the switching on/off of the AGC loop in the drive circuit is controlled by the control unit. A drive signal based on a control voltage that is set by the AGC loop in an on-period of the AGC loop is outputted in an off-period of the AGC loop, thereby driving the physical quantity transducer. Thus, in the off-period of the AGC loop, which is considered to have less noise, the physical quantity transducer is driven by the drive signal based on the setting in the on-period of the AGC loop, thereby enabling execution of detection processing of a desired signal. Therefore, compared with the case where detection processing is carried out only by the driving during the on-period of the AGC loop, detection processing of a desired signal with high detection performance can be realized.

In the detection device, the drive circuit may include: an amplifier circuit which amplifies the feedback signal; a drive signal output circuit which outputs the drive signal on the basis of the signal amplified by the amplifier circuit; and a gain control circuit which outputs the control voltage to the drive signal output circuit and controls an amplitude of the drive signal. The control unit may control switching on/off of a switch element provided in a path of the AGC loop in the gain control circuit and thereby control the switching on/off of the AGC loop.

According to this configuration, the AGC loop is switched off by switching off the switch element provided in the path of the AGC loop, and in the off-period of the AGC loop, which is considered to have less noise, the drive signal based on the setting in the on-period of the AGC loop is outputted to the physical quantity transducer so that the physical quantity transducer can be driven.

In the detection device, the gain control circuit may include an integrator which outputs the control voltage to control the amplitude of the drive signal, to the drive signal output circuit. The integrator may include: an operational amplifier; a capacitor provided between an output node of the operational amplifier and a node of an inverting input terminal of the operational amplifier; and a resistance element having one end electrically connected to an input node of the integrator. The switch element may be a switch element provided between the other end of the resistance element and the inverting input terminal of the operational amplifier. The gain control circuit may output the control voltage that is sampled and held in the integrator as the switch element is switched off, to the drive signal output circuit in the off-period of the AGC loop. The drive signal output circuit may output the drive signal based on the control voltage that is sampled and held, to the physical quantity transducer and thus drive the physical quantity transducer in the off-period of the AGC loop.

According to this configuration, the circuit configuration of the integrator used for the gain control circuit is effectively utilized so that the control voltage in the on-period of the AGC loop is sampled and held, and the drive signal based on the control voltage that is sampled and held can be outputted to the physical quantity transducer in the off-period of the AGC loop.

In the detection device, the resistance element may be a resistance element with variable resistance. In the on-period of the AGC loop, the resistance element may be set to a first resistance value. In the off-period of the AGC loop, the resistance element may be set to a second resistance value that is higher than the first resistance value.

According to this configuration, since the resistance element has a high resistance in the off-period of the AGC loop, in which the switch element is off, the current path or the like of a leakage current from the switch element can be limited. Therefore, missing electric charge or the like from a charge accumulation node of the control voltage can be restrained.

In the detection device, the resistance element may be switched from the first resistance value to the second resistance value at a timing before a timing when AGC loop is switched off from on.

According to this configuration, at the timing when the AGC loop is switched off from on, the resistance element is set to a high resistance. Therefore, electric potential fluctuation at the charge accumulation node of the control voltage due to change in the timing can be minimized.

In the detection device, the resistance element may be switched from the second resistance value to the first resistance value at a timing before a timing when AGC loop is switched on from off.

According to this configuration, at the timing when the AGC loop is switched on from off, the resistance element is set to a low resistance. Therefore, the convergence time of AGC gain control is shortened, enabling increase in the speed of AGC convergence operation.

In the detection device, the gain control circuit may include a full-wave rectifier which performs full-wave rectification of an output signal from the amplifier circuit and outputs the full-wave-rectified signal to the integrator. In the off-period of the AGC loop, the full-wave rectifier may beset to an operation off state or low power consumption mode.

According to this configuration, unwanted consumption of power by the full-wave rectifier can be restrained in the off-period of the AGC loop.

In the detection device, the gain control circuit may have a second switch element provided between the switch element and an output node of the amplifier circuit. In the off-period of the AGC loop, the second switch element may be off.

As the second switch element on the stage preceding the switch element is off in the off-period of the AGC loop, in this manner, the current path of a leakage current from the switch element can be limited. Therefore, missing electric charge or the like due to the leakage current can be restrained.

In the detection device, the drive circuit may include: an amplifier circuit which amplifies the feedback signal; a drive signal output circuit which outputs the drive signal on the basis of the signal amplified by the amplifier circuit; and a gain control circuit which outputs the control voltage to the drive signal output circuit and controls an amplitude of the drive signal. The gain control circuit may sample and hold the control voltage that is set in the on-period of the AGC loop, and output the control voltage that is sampled and held to the drive signal output circuit in the off-period of the AGC loop. The drive signal output circuit may output the drive signal based on the control voltage that is sampled and held, to the physical quantity transducer and thus drive the physical quantity transducer in the off-period of the AGC loop.

According to this configuration, the control voltage that is set in the on-period of the AGC loop is sampled and held, and the drive signal based on the control voltage that is sampled and held is outputted to the physical quantity transducer in the off-period of the AGC loop. Thus, the physical quantity transducer can be driven by the drive signal based on the control voltage that is set by the AGC loop in the on-period of the AGC loop.

The detection device may also have a register unit including a control register for on/off control of the AGC loop. The control unit may perform on/off control of the AGC loop on the basis of a setting of the control register.

According to this configuration, a suitable setting corresponding to an application can be carried to the control register, and on/off control of the AGC loop can be executed accordingly.

In the detection device, the register unit may have a setting register for a mode in which switching on/off of the AGC loop is repeated, as the control register.

According to this configuration, for example, if the drive current fluctuates in the off-period of the AGC loop, the original drive current can be restored in the next on-period. Therefore, on/off control of the AGC loop that is suitable for an application which carries out detection processing over a long time can be realized.

In the detection device, the register unit may have a setting register for a mode in which the AGC loop is switched on at the time of startup and is switched off after the startup is complete, as the control register.

According to this configuration, on/off control of the AGC loop that is suitable for an application which requires detection processing with high detection performance only during a predetermined period following the startup can be realized.

In the detection device, the register unit may have a register which sets at least one of length information of the on-period of the AGC loop and length information of the off-period of the AGC loop, as the control register.

According to this configuration, the length of the on-period or off-period of the AGC loop can be set to a suitable period length corresponding to an application or the like.

Still another aspect of the invention relates to a sensor including: any of the detection devices described above; and a physical quantity transducer.

Yet another aspect of the invention relates to an electronic apparatus including any of the detection devices described above.

Still yet another aspect of the invention relates to a moving object including any of the detection devices described above.

BRIEF DESCRIPTION OF THE DRAWINGS

The invention will be described with reference to the accompanying drawings, wherein like numbers reference like elements.

FIGS. 8A to 8C are explanatory views showing the problem of a fall in detection performance when the AGC loop is on.

FIGS. 12A to 12D show examples of register maps in an on/off control register for the AGC loop.

DESCRIPTION OF EXEMPLARY EMBODIMENTS

Hereinafter, a preferred embodiment of the invention will be described in detail. The following embodiment should not unduly limit the contents of the invention described in the appended claims. Not all the configurations described in the embodiment are essential to the solutions of the invention. For example, the description below illustrates a case where a piezoelectric oscillator (oscillation gyro) is used as a physical quantity transducer and where a gyro sensor is used as a sensor. However, the invention is not limited to this case. For example, the invention can also be applied to an electrostatic capacitance detection-type oscillator (oscillation gyro) formed of a silicon substrate or the like, or a physical quantity transducer, sensor or the like which detects a physical quantity equivalent to angular velocity information or other physical quantities than angular velocity information.

1. Electronic Apparatus, Gyro Sensor

Figure 1:
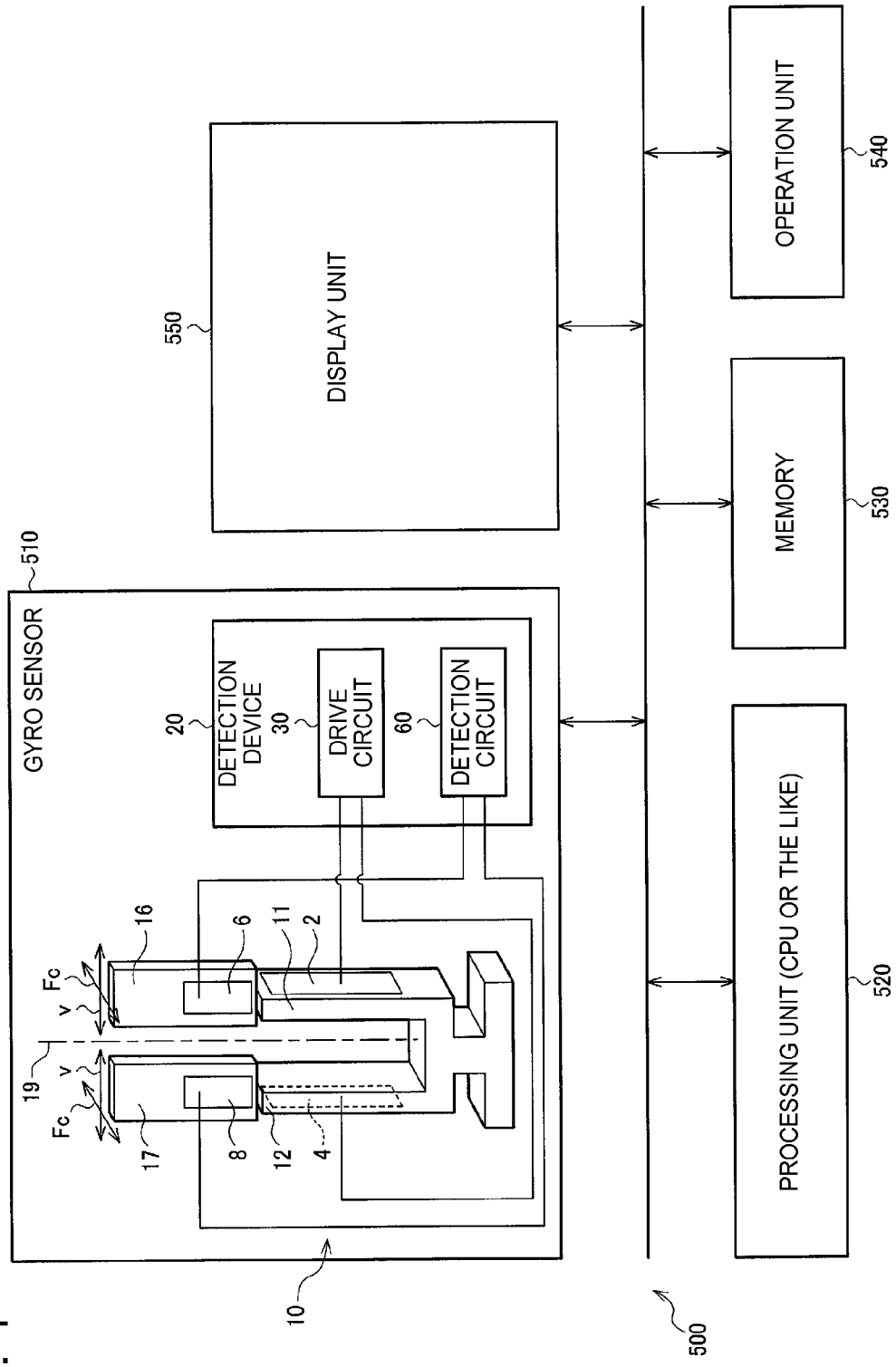
FIG. 1 shows an example of the configuration of an electronic apparatus and a gyro sensor according to an embodiment.

FIG. 1 shows an example of the configuration of a gyro sensor 510 (in a broad sense, a sensor) including a detection device 20 of this embodiment, and an electronic apparatus 500 including the gyro sensor 510. It should be noted that the electronic apparatus 500 and the gyro sensor 510 are not limited to the configuration of FIG. 1 and can be modified in various manners, such as omitting a part of the components or adding another component. As the electronic apparatus 500 of this embodiment, various apparatuses can be considered such as a digital camera, video camera, smartphone, mobile phone, car navigation system, robot, game machine, timepiece, health appliance, or mobile information terminal.

The electronic apparatus 500 includes the gyro sensor 510 and a processing unit 520. The electronic apparatus 500 can also include a memory 530, an operation unit 540, and a display unit 550. The processing unit 520 (CPU, MPU or the like) carries out control of the gyro sensor 510 or the like and overall control of the electronic apparatus 500. The processing unit 520 also carries out processing based on angular velocity information (in a broad sense, a physical quantity) detected by the gyro sensor 510. For example, the processing unit 520 carries out processing for image stabilization, posture control, GPS autonomous navigation or the like, based on angular velocity information. The memory 530 (ROM, RAM or the like) stores a control program and various data and functions as a work area and a data storage area. The operation unit 540 is configured for the user to operate the electronic apparatus 500. The display unit 550 displays various kinds of information to the user.

The gyro sensor 510 (sensor) includes an oscillator 10 and the detection device 20. The oscillator 10 of FIG. 1 (in a broad sense, a physical quantity transducer) is a tuning fork-type piezoelectric oscillator formed of a thin plate of a piezoelectric material such as quartz crystal, and includes drive oscillators 11, 12 and detection oscillators 16, 17. Drive terminals 2, 4 are provided on the drive oscillators 11, 12. Detection terminals 6, 8 are provided on the detection terminals 16, 17.

A drive circuit 30 included in the detection device 20 outputs a drive signal (drive voltage) and thus drives the oscillator 10. The drive circuit 30 then receives a feedback signal from the oscillator 10 and thus excites the oscillator 10. A detection circuit 60 receives a detection signal (detection current, electric charge) from the oscillator 10 driven by the drive signal, and detects (extracts) a desired signal (Coriolis force signal) corresponding to the physical quantity applied to the oscillator 10, from the detection signal.

Specifically, an AC drive signal (drive voltage) from the drive circuit 30 is applied to the drive terminal 2 of the drive oscillator 11. Consequently, a reverse voltage effect causes the drive oscillator 11 to start oscillating, and tuning fork oscillation causes the drive oscillator 12 to start oscillating as well. At this point, a current (electric charge) generated by the piezoelectric effect of the drive oscillator 12 is fed back to the drive circuit 30 as a feedback signal from the drive terminal 4. An oscillation loop including the oscillator 10 is thus formed.

As the drive oscillators 11, 12 oscillate, the detection oscillators 16, 17 oscillate at an oscillation speed v in the direction shown in FIG. 1. Consequently, a current (electric charge) generated by the piezoelectric effect of the detection oscillators 16, 17 is outputted from the detection terminals

6, 8 as detection signals (first and second detection signals). The detection circuit 60 receives the detection signals from the oscillator 10 and detects a desired signal (desired wave) that is a signal corresponding to the Coriolis force. That is, as the oscillator 10 (gyro sensor) rotates about a detection axis 19, a Coriolis force Fc is generated in a direction orthogonal to the oscillating direction of the oscillation speed v. If, for example, the angular velocity when the oscillator 10 rotates about the detection axis 19 is ω, the mass of the oscillator is m, and the oscillation speed of the oscillator is v, the Coriolis force is expressed as Fc=2m×v×ω. Therefore, as the detection circuit 60 detects a desired signal that is a signal corresponding to the Coriolis force, the rotational angular velocity ω of the gyro sensor can be found. Using the angular velocity ω that is found, the processing unit 520 can carry out various kinds of processing for image stabilization, posture control, or GPS autonomous navigation or the like.

While FIG. 1 shows the example in which the oscillator 10 is a tuning fork-type, the oscillator 10 of this embodiment is not limited to such a structure. For example, a T-shape, double-T-shape or the like may also be employed. The piezoelectric material of the oscillator 10 may be other than quartz crystal.

2. Detection Device

Figure 2:
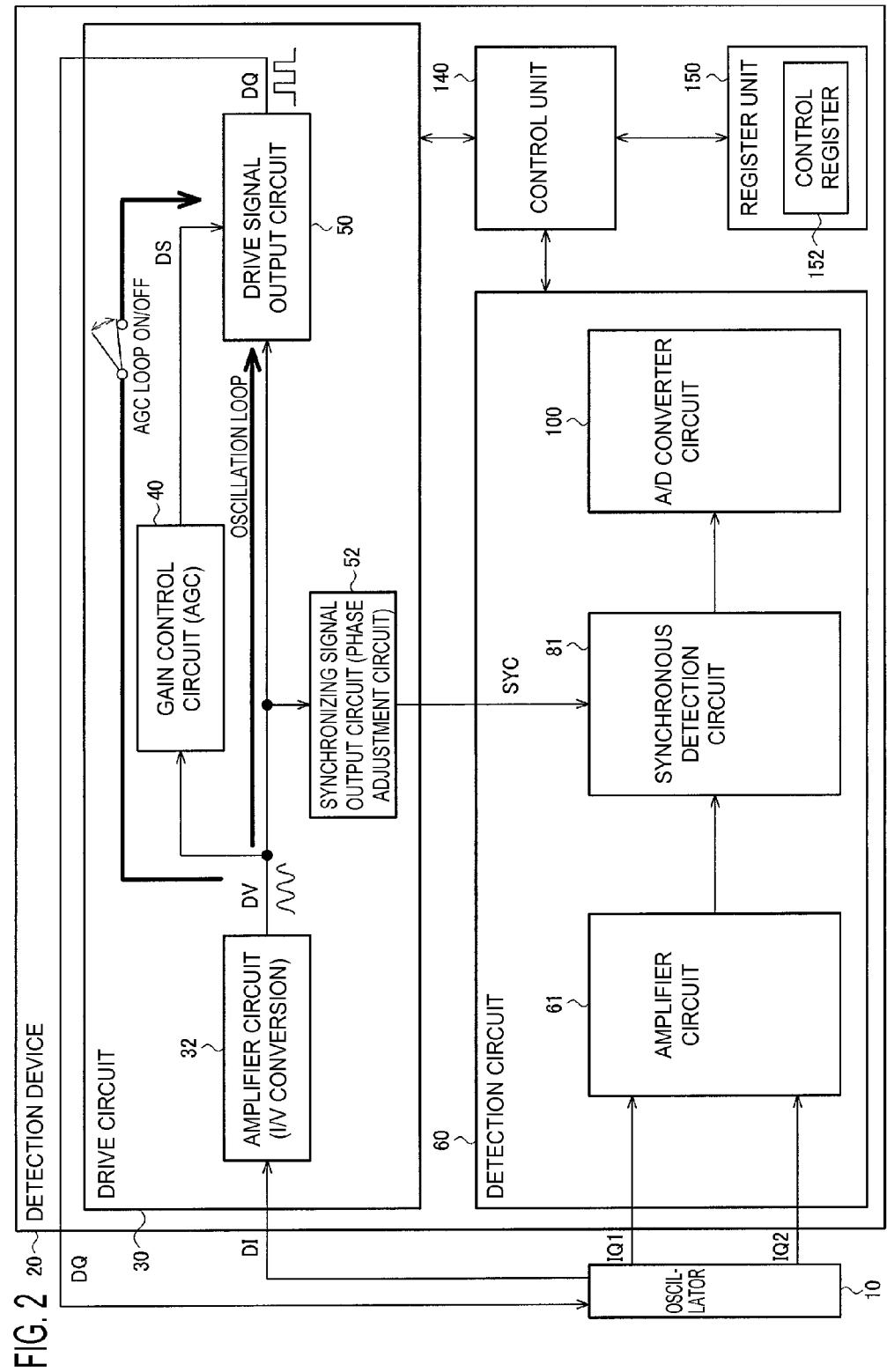
FIG. 2 shows an example of the configuration of a detection device according to an embodiment.

FIG. 2 shows an example of the configuration of the detection device 20 of this embodiment. The detection device 20 includes the drive circuit 30, which receives a feedback signal DI from the oscillator 10 (physical quantity transducer) and drives the oscillator 10, and the detection circuit 60, which receives detection signals IQ1, IQ2 from the oscillator 10 and detects a desired signal.

The drive circuit 30 includes an amplifier circuit 32 to which the feedback signal DI from the oscillator 10 is inputted, a gain control circuit 40 which performs automatic gain control, and a drive signal output circuit 50 which outputs a drive signal DQ to the oscillator 10. The drive circuit 30 also includes a synchronizing signal output circuit 52 which outputs a synchronizing signal SYC to the detection circuit 60. The configuration of the drive circuit 30 is not limited to FIG. 2 and can be modified in various manners such as omitting a part of the components or adding another component.

The amplifier circuit 32 (I/V converter circuit) amplifies the feedback signal DI from the oscillator 10. For example, the amplifier circuit 32 converts the current signal DI from the oscillator 10 to a voltage signal DV and outputs the voltage signal DV. The amplifier circuit 32 can be realized with a capacitor, a resistance element, an operational amplifier or the like.

The drive signal output circuit 50 outputs the drive signal DQ based on the signal DV amplified by the amplifier circuit 32. For example, the drive signal output circuit 50 outputs a drive signal of a square wave (or sine wave). The drive signal output circuit 50 can be realized with a comparator or the like.

The gain control circuit 40 (AGC) outputs a control voltage DS to the drive signal output circuit 50 and thus controls the amplitude of the drive signal DQ. Specifically, the gain control circuit 40 monitors the signal DV and controls the gain of the oscillation loop. For example, in the drive circuit 30, the amplitude of the drive voltage supplied to the oscillator 10 (drive oscillator) needs to be kept constant in order to keep the sensitivity of the gyro sensor constant. Therefore, the gain control circuit 40 for automatic adjustment of gain is provided within the oscillation loop in the drive oscillation system. The gain control circuit 40 automatically adjusts gain in a variable manner so that the amplitude of the feedback signal DI from the oscillator 10 (oscillation speed v of the oscillator) becomes constant.

The synchronizing signal output circuit 52 receives the signal DV amplified by the amplifier circuit 32 and outputs the synchronizing signal SYC (reference signal) to the detection circuit 60. The synchronizing signal output circuit 52 can be realized with a comparator which binarizes the sine-wave (AC) signal DV to generate a square-wave synchronizing signal SYC, a phase adjustment circuit (phase shifter) which performs phase adjustment of the synchronizing signal SYC, or the like.

The detection circuit 60 includes an amplifier circuit 61, a synchronous detection circuit 81, and an A/D converter circuit 100. The amplifier circuit 61 receives the first and second detection signals IQ1, IQ2 from the oscillator and caries out amplification of the signals and charge-voltage conversion. The synchronous detection circuit 81 carries out synchronous detection based on the synchronizing signal SYC from the drive circuit 30. The A/D converter circuit 100 carries out A/D conversion of the signal after the synchronous detection. As the configuration of the detection circuit 60, configurations using various systems can be employed as described later. These configurations will be described in detail later.

The detection device 20 can further include a control unit 140 and a register unit 150. The control unit 140 carries out control processing of the detection device 20. The control unit 140 can be realized with a logic circuit (gate array or the like), a processor or the like. The register unit 150 has a register for carrying out various controls and various settings of the detection device 20. The register of the register unit 150 can be realized, for example, with a memory, a flip-flop circuit or the like. In the register of the register unit 150, a register value is set, for example, via an external interface, not shown. The control unit 140 executes various kinds of control processing based on the register value of the register.

3. On/Off Control of AGC Loop

In this embodiment, the AGC (automatic gain control) loop in the drive circuit 30 is on/off-controlled. For example, the on/off control of the AGC loop is carried out by the control unit 140. The drive circuit 30 outputs the drive signal DQ based on the setting in an on-period of the AGC loop to the oscillator 10 in an off-period of the AGC loop and thus drives the oscillator 10 (physical quantity transducer). For example, the drive circuit 30 outputs the drive signal DQ based on the control voltage DS (control signal) that is set by the AGC loop (gain control circuit 40) in an on-period of the AGC loop to the oscillator 10 in an off-period of the AGC loop and thus drives the oscillator 10.

That is, in the on-period of the AGC loop, the gain control circuit 40 outputs the control voltage DS generated by the AGC loop to the drive signal output circuit 50. Specifically, the gain control circuit 40 outputs the control voltage DS set by the AGC loop in such a way that loop gain that is the gain of the oscillation loop becomes 1. The drive signal output circuit 50 outputs the drive signal DQ with the amplitude thereof controlled by the control voltage DS. That is, the drive signal output circuit 50 outputs the drive signal DQ controlled in such a way that the loop gain becomes 1. The drive signal DQ is, for example, a square-wave signal but may be a sine-wave signal. The detection circuit 60 receives the detection signals IQ1, IQ2 from the oscillator 10 driven by such a drive signal DQ, and detects a desired signal.

Meanwhile, in the off-period of the AGC loop, the gain control circuit 40 outputs the control voltage DS based on the setting in the on-period of the AGC loop preceding the off-period in question, to the drive signal output circuit 50. For example, the gain control circuit 40 samples and holds the control voltage DS set in the on-period of the AGC loop. The control voltage DS is sampled and held, for example, by an integrator 44, described later. However, the control voltage DS may also be sampled and held, using other circuit configurations than the integrator 44. The gain control circuit 40 then outputs the control voltage DS sampled and held in the on-period, to the drive signal output circuit 50 in the off-period of the AGC loop. The drive signal output circuit 50 outputs the drive signal DQ based on the control voltage DS that is sampled and held, to the oscillator 10 in the off-period of the AGC loop and thus drives the oscillator 10.

In this way, the drive signal output circuit 50 outputs the drive signal DQ based on the control voltage DS that is set by the AGC loop in the on-period of the AGC loop, and thus drives the oscillator 10. In the off-period of the AGC loop, the detection circuit 60 receives the detection signals IQ1, IQ2 from the oscillator 10 driven by the drive signal DQ based on the control voltage DS sampled and held in the on-period, and detects a desired signal.

An off-period of the AGC loop is a period in which the AGC loop is disconnected and therefore the gain control by the AGC loop does not work. Meanwhile, an on-period of the AGC loop is a period in which the AGC loop is not disconnected and therefore the gain control by the AGC loop works and the amplitude of the drive signal DQ is controlled. For example, a switch element (for example, a switch element SW, described later) is provided in the path of the AGC loop in the gain control circuit 40. The control unit 140 controls the switching on/off of the switch element provided in the path of the AGC loop, thereby controlling the switching on/off of the AGC loop.

The gain control by the AGC loop in the gain control circuit 40 is carried out, for example, for the purpose of making the drive current of the oscillator 10 constant regardless of temperature and thus making the detection sensitivity constant. Specifically, the gain control circuit 40 generates a control voltage DS based on a feedback signal from the oscillator 10 and outputs the control voltage DS to the drive signal output circuit 50. As the drive signal output circuit 50 adjusts the amplitude (voltage level) of the drive signal DQ of the oscillator 10 on the basis of this control voltage DS, feedback control to keep the drive current constant is performed.

However, it is confirmed that the implementation of the feedback control by the AGC loop may result in an increase in noise and hence a fall in detection performance.

Figure 3:
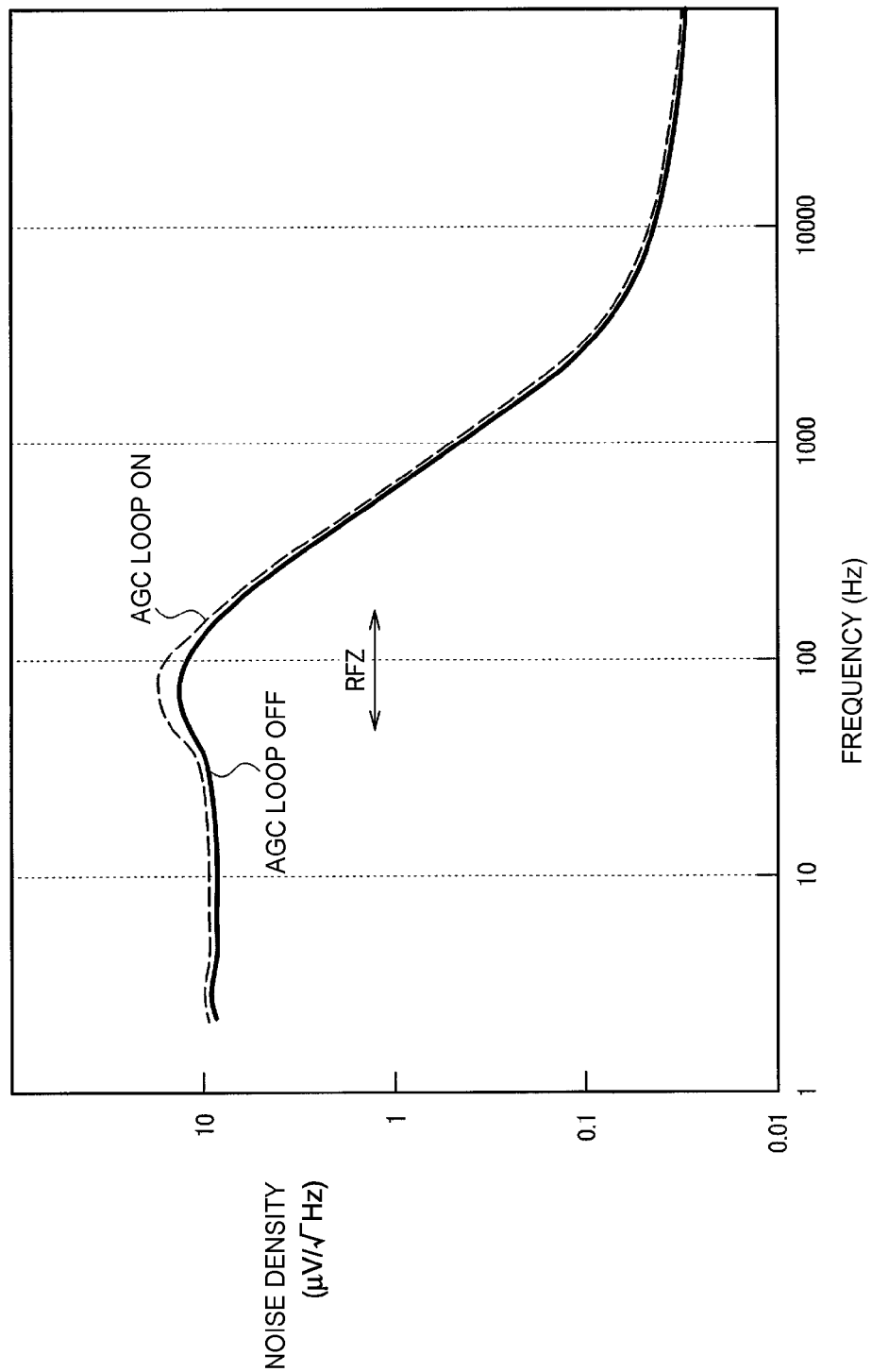
FIG. 3 shows an example of a frequency characteristic of noise in the case where an AGC loop is switched on/off.

For example, FIG. 3 shows the frequency characteristic of noise in a gyro sensor output in the case where the AGC loop is switched on/off. As shown in FIG. 3, when the AGC loop is on, the noise component (noise density) rises in a frequency band RFZ of, for example, near 100 Hz (several ten to several hundred Hz), compared with the case where the AGC loop is off. Thus, the detection performance of the detection device is lowered. The frequency band RFZ where the noise component rises differs from product to product and varies, for example, according to the circuit constant or the like of the detection device.

As a technique for coping with such a fall in detection performance, for example, a technique in which the cutoff frequency of digital filter processing in the detection device is set to a lower frequency than the frequency band RFZ so as to remove the noise component may be considered. That is, a DSP unit which carries out band-limited digital filter processing corresponding to the application of a desired signal is provided in the detection device, and the cutoff frequency of the digital filter processing by the DSP unit is set to be lower than the frequency band RFZ.

However, depending on the application, band limitation by a cutoff frequency (for example, 200 Hz) that is higher than the frequency band RFZ may be required. Therefore, to cope with such an application, there is a need to change the circuit constant or the like of the detection device. That is, the circuit constant or the like of the detection device needs to be changed for each application and circuits with a common circuit constant cannot be used. This leads to an increase in manufacturing cost and complexity of product management.

Meanwhile, a technique in which the loop is switched to a different oscillation loop from the time of normal operation, as in the sleep mode of JP-A-2008-139287, has a problem that the drive current of the oscillator cannot be made constant when the oscillation is driven using the oscillation loop in question and consequently a desired signal cannot be detected properly.

Thus, in this embodiment, after the AGC loop is switched on and the oscillator 10 is driven under the gain control by the AGC loop, the AGC loop is switched off. Then, even in the off-period of the AGC loop, the oscillator 10 is driven by the drive signal DQ based on the control voltage DS that is set by the AGC loop in the on-period, and a desired signal is thus detected by the detection circuit 60.

With this configuration, detection processing of a desired signal can be carried out in an off-period of the AGC loop, in which there is less noise. Therefore, the detection performance of the detection device can be improved, compared with the case where detection processing is carried out only in an on-period of the AGC loop.

Moreover, in this embodiment, driving of the oscillator 10 in the off-period of the AGC loop is carried out using the drive signal DQ based on the control voltage DS set in the on-period of the AGC loop. For example, as the drive signal DQ based on the control voltage DS sampled and held by the gain control circuit 40 is used, the oscillator 10 can be driven, for example, using the drive signal DQ in the same state as the signal at the timing of switching from the on-period to the off-period of the AGC loop. This has an advantage that the detection performance of the detection device can be improved while the function of making the drive current constant is maintained.

Also, in the embodiment, various modes for realizing such an on/off technique of the AGC loop are prepared.

Specifically, in the embodiment, a control register 152 for the on/off control of the AGC loop is provided in the register unit 150, as shown in FIG. 2. That is, the control register 152 for setting various modes with respect to the on/off control of the AGC loop and for setting length information of the on-period and off-period is provided. The control unit 140 carries out the on/off control of the AGC loop based on the setting (register value) in the control register 152.

For example, the register unit 150 has a setting register for a mode in which the switching on/off of the AGC loop is repeated, as the control register 152. When this mode is set, the control unit 140 carries out control to repeat the switching on/off of the AGC loop (switching on/off of the switch element provided in the path of the AGC loop) every predetermined period.

For example, in an application where inertial navigation is carried out using a gyro sensor, if an off-period continues for a long period after the AGC loop is switched off from on, the drive current fluctuates, generating a risk that proper detection processing cannot be realized. Therefore, in such an application, setting the mode in which the switching on/off of the AGC loop is repeated allows the detection performance to be maintained even in detection processing over a long period.

The register unit 150 also has a setting register for a mode in which the AGC loop is on at the time of startup (startup period) and in which the AGC loop is off after the startup is complete (after the lapse of the startup period), as the control register 152. When this mode is set, the control unit 140 carries out control to switch on the AGC loop at the time of startup of oscillation (when power is turned on) and to switch off the AGC loop after the startup is determined as complete.

For example, in an application such as a digital camera, it is often the case that the user turns the power on, presses the shutter button and turns the power off immediately afterwards. Therefore, in such an application, setting the mode in which the AGC loop is on at the time of startup (startup period) and in which the AGC loop is off after the startup is complete (after the lapse of the startup period) enables realization of both improvement in detection performance and reduction in power consumption.

The register unit 150 also has a register for setting at least one of the length information of the on-period of the AGC loop and the length information of the off-period of the AGC loop, as the control register 152. For example, in the mode in which the switching on/off of the AGC loop is repeated, an on-period and an off-period having a period length set by the length information in the control register 152 are repeated alternately. Also, in the mode in which the AGC loop is on at the time of startup and in which the AGC loop is off after the startup is complete, the length or the like of the on-period of the AGC loop at the time of startup is set on the basis of the length information set in the control register 152.

The provision of such a register for setting the length information of the on-period and off-period allows the on-period and off-period to be set to an optimum period length corresponding to each application. The length information is, for example, time information representing the length of the period. However, the embodiment is not limited to this and various kinds of information that substantially specifies the length of the period can be employed.

4. Detailed Configuration and Operation of Drive Circuit

Figure 4:
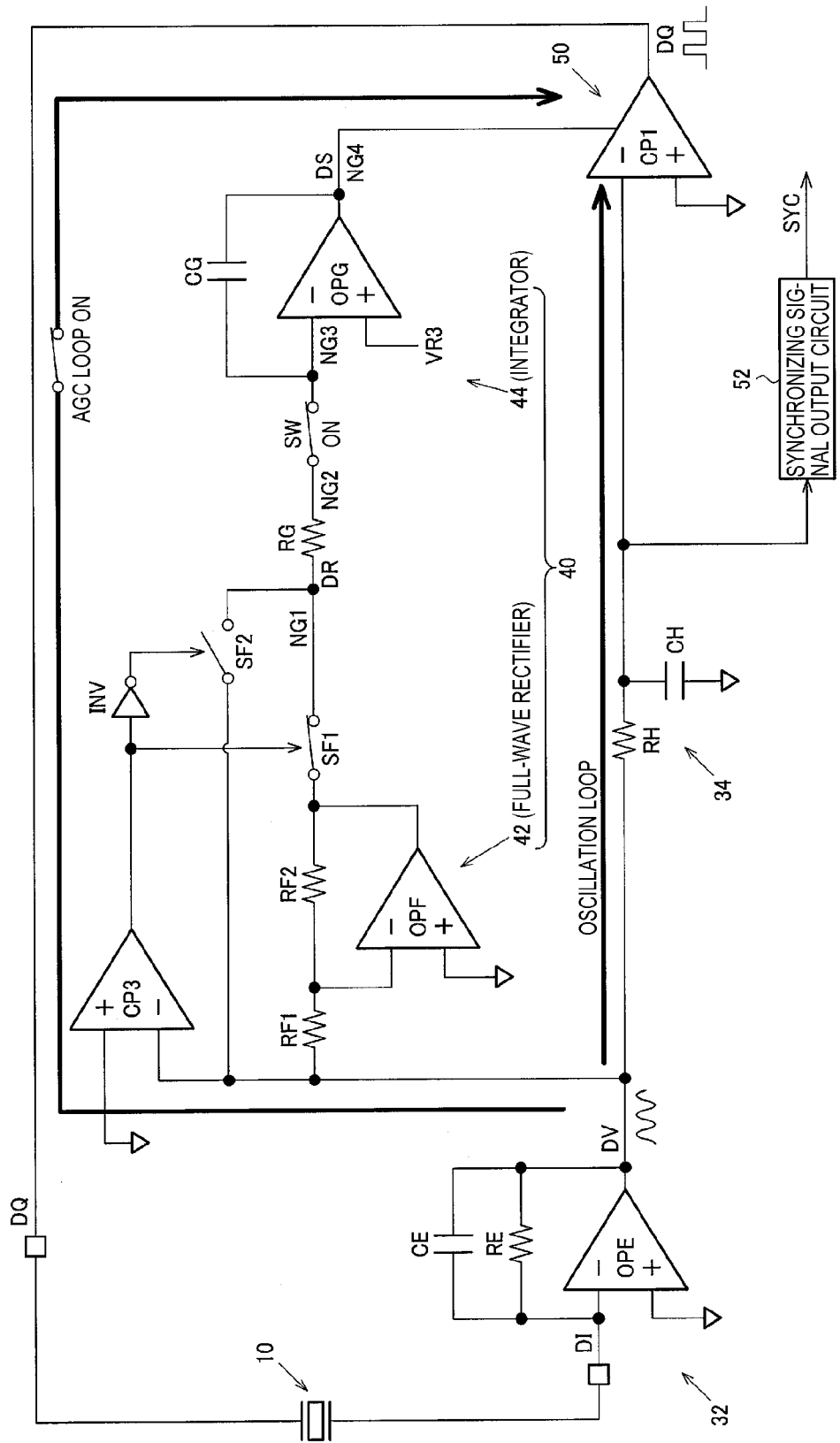
FIG. 4 is an explanatory view showing the detailed configuration and operation of a drive circuit.
Figure 5:
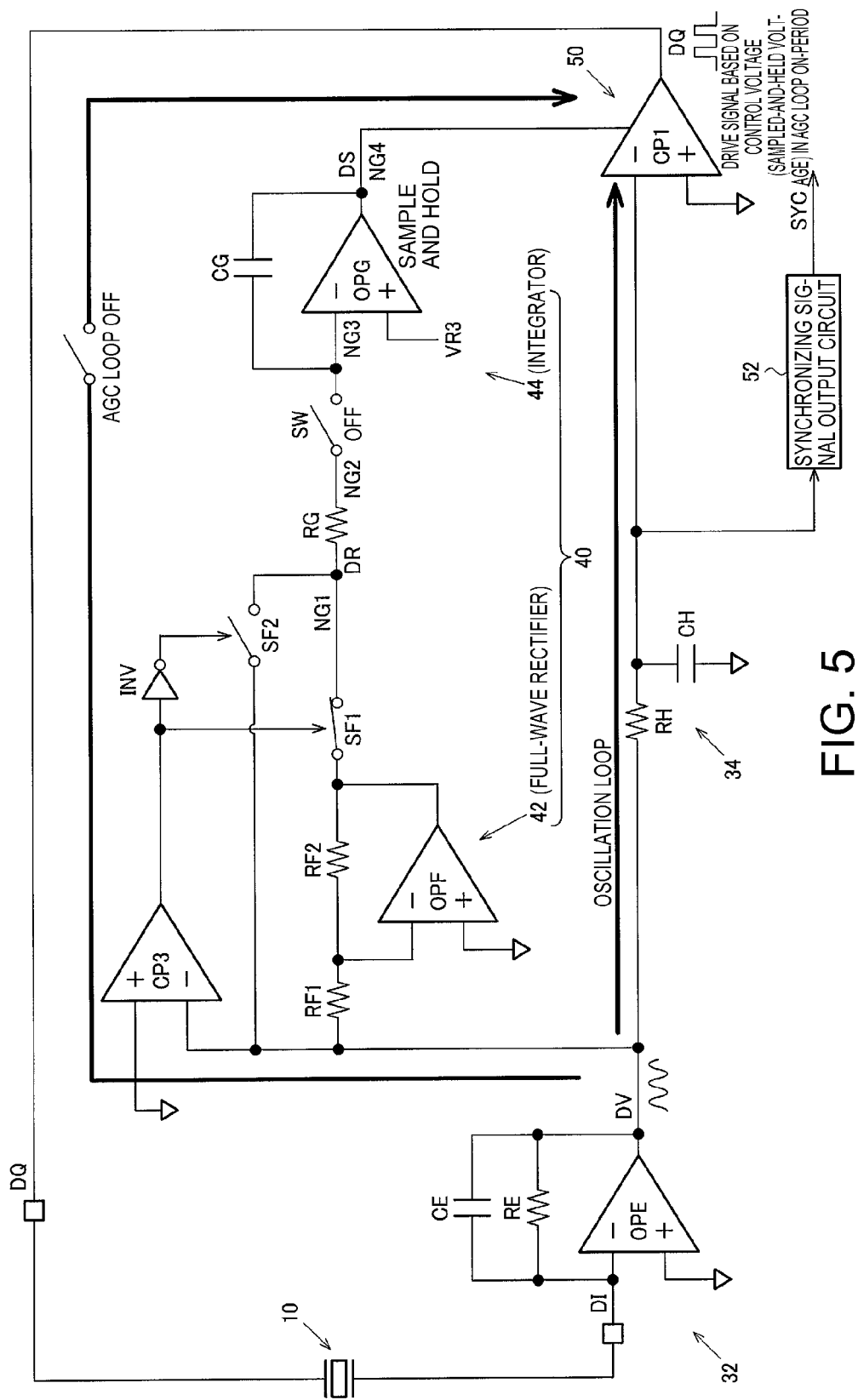
FIG. 5 is an explanatory view showing the detailed configuration and operation of the drive circuit.

FIGS. 4 and 5 illustrate the detailed configuration and operation of the drive circuit 30.

In FIG. 4, the amplifier circuit 32 is an integration-type current-voltage converter circuit (I/V converter circuit) having a low-pass filter characteristic, and includes an operational amplifier OPE, a capacitor CE, and a resistance element RE. The non-inverting input terminal (first input terminal) of the operational amplifier OPE is set to a predetermined electric potential (for example, AGND), and a signal DI from the oscillator 10 is inputted to the inverting input terminal (second input terminal). The capacitor CE and the resistance element RE are provided between the output node of the amplifier circuit 32 and the node of the inverting input terminal of the operational amplifier OPE.

A low-pass filter 34 is provided between the amplifier circuit 32 and the drive signal output circuit 50 and outputs a low-pass-filtered signal DV to the drive signal output circuit 50. The low-pass filter 34 has a resistance element RH and a capacitor CH. It should be noted that various modifications can be made such as omitting the configuration of the low-pass filter 34 or providing a high-pass filter instead of the low-pass filter 34.

The gain control circuit 40 (AGC) is a circuit which automatically adjusts gain in such a way that loop gain becomes 1, in an oscillation stationary state. The gain control circuit 40 has a full-wave rectifier 42 and an integrator 44. The gain control circuit 40 may also include an oscillator detector or the like which detects an oscillation state.

The full-wave rectifier 42 performs full-wave rectification of an output signal DV of the amplifier circuit and outputs a full-wave-rectified signal DR to the integrator 44. The full-wave rectifier 42 has an operational amplifier OPF, resistance elements RF1, RF2, a comparator CP3, switch elements SF1, SF2, and an inverter circuit INV.

The resistance element RF1 is provided between the input node of the signal DV and the node of the inverting input terminal of the operational amplifier OPF. The resistance element RF2 is provided between the output node and the node of the inverting input terminal of the operational amplifier OPF.

The switch element SF1 is provided between the output node of the operational amplifier OPF and an input node NG1 of the integrator 44. The switch element SF2 is provided between the node of the signal DV and the input node NG1 of the integrator 44. The switch elements SF1, SF2 are exclusively on/off-controlled on the basis of an output signal of the comparator CP3, which compares the voltage of the signal DV with a voltage of a predetermined electric potential. Thus, the signal DR is a signal resulting from the full-wave rectification of the signal DV.

The integrator 44 outputs a control voltage DS for the amplitude of the drive signal DQ, to the drive signal output circuit 50. Specifically, the integrator 44 carries out integration processing of the signal DR that is full-wave-rectified by the full-wave rectifier 42 and outputs the control voltage DS resulting from the integration processing, to the drive signal output circuit 50.

The integrator 44 has an operational amplifier OPG, a resistance element RG, and a capacitor CG. The capacitor CG is provided between an output node NG4 of the operational amplifier OPG and a node NG3 of the inverting input terminal of the operational amplifier OPG. The non-inverting input terminal of the operational amplifier OPG is set to a predetermined voltage VR3. The resistance element RG is provided between the input node NG1 of the integrator 44 and the node NG3 of the inverting input terminal of the operational amplifier OPG.

A comparator CP1 forming the drive signal output circuit 50 has the non-inverting input terminal thereof set to a predetermined electric potential (for example, AGND), and the signal DV amplified by the amplifier circuit 32 (for example, filtered signal) is inputted to the inverting input terminal. The comparator CP1 outputs a square-wave drive signal DQ formed by binarizing the signal DV. Even though the square-wave drive signal DQ is outputted to the oscillator 10, the frequency filtering effect of the oscillator 10 reduces unwanted harmonics, thus enabling the drive signal DQ with a target frequency (resonance frequency) to be acquired. The comparator CP1 has a differential unit and an output unit connected to the differential unit. The control voltage DS from the gain control circuit 40 (integrator) is supplied as a power-supply voltage of the output unit of the comparator CP1 (high potential-side power-supply voltage). Thus, the amplitude of the drive signal DQ outputted from the comparator CP1 changes according to the control voltage DS from the gain control circuit 40, and gain control to achieve loop gain of 1 in the oscillation stationary state is realized.

The configuration of the drive circuit 30 is not limited to the configuration shown in FIG. 4 and various modifications can be made thereto. For example, while the drive signal output circuit 50 in FIG. 4 includes the comparator CP1 outputting the square-wave drive signal DQ, the drive signal output circuit 50 may also be configured with a gain amplifier or the like which outputs a sine-wave drive signal DQ. In such a case, the amplitude of the drive signal DQ can be controlled by controlling the gain in the gain amplifier on the basis of the control voltage DS from the gain control circuit 40.

In the embodiment, the switch element SW is provided in the path of the AGC loop in the gain control circuit 40. The control unit 140 controls the switching on/off of the switch element SW and thereby controls the switching on/off of the AGC loop.

For example, to switch the AGC loop on, the switch element SW is switched on, as shown in FIG. 4. Thus, the control voltage DS controlled by the AGC loop on the basis of the feedback signal DI from the oscillator 10 is outputted to the drive signal output circuit 50, and the amplitude of the drive signal DQ is controlled in such a way that the drive current becomes constant.

Meanwhile, to switch the AGC loop off, the switch element SW is switched off, as shown in FIG. 5. Thus, the AGC loop is disconnected. Also in this case, the control voltage DS set in the on-period of the AGC loop is outputted to the drive signal output circuit 50. The drive signal output circuit 50 outputs the drive signal DQ based on this control voltage DS and thus drives the oscillator 10. For example, in the sleep mode of JP-A-2008-139287, the loop is switched to another oscillation loop. However, in this embodiment, even when the AGC loop is switched off from on, the same oscillation loop is used and oscillation driving of the oscillator 10 is carried out with the drive signal DQ based on the control voltage DS set in the on-period of the AGC loop.

Specifically, the resistance element RG of the integrator 44 has one end thereof electrically connected to the input node NG1 of the integrator 44, and the switch element SW is provided between the other end of the resistance element RG and the node of the inverting input terminal of the operational amplifier OPG. The provision of such a switch element SW enables the integrator 44 to function as a sample-and-hold circuit for the control voltage DS. That is, when the switch element SW is switched off, the movement of electric charge accumulated at the electrode on the side of the node NG3 of the capacitor CG is limited and therefore the control voltage DS at the timing when the AGC loop is switched off from on is sampled and held by the integrator 44.

Then, the gain control circuit 40 outputs the control voltage DS that is sampled and held by the integrator 44 as the switch element SW is switched off, to the drive signal output circuit 50. The drive signal output circuit 50 outputs the drive signal DQ based on the control voltage DS that is sampled and held, to the oscillator 10 in the off-period of the AGC loop and thus drives the oscillator 10.

In this case, if the length of the on-period of the AGC loop is sufficiently long, the startup of the oscillation of the oscillator 10 is complete. Therefore, it can be expected that, by driving with the drive signal DQ of the amplitude based on the control voltage DS that is sampled and held at the timing when the AGC loop (switch element SW) is switched off from on, the drive current of the oscillator 10 is kept constant to a certain extent.

Next, the reason for the phenomenon of falling noise performance when the AGC loop is switched on, as shown in FIG. 3, will be described.

Figure 6:
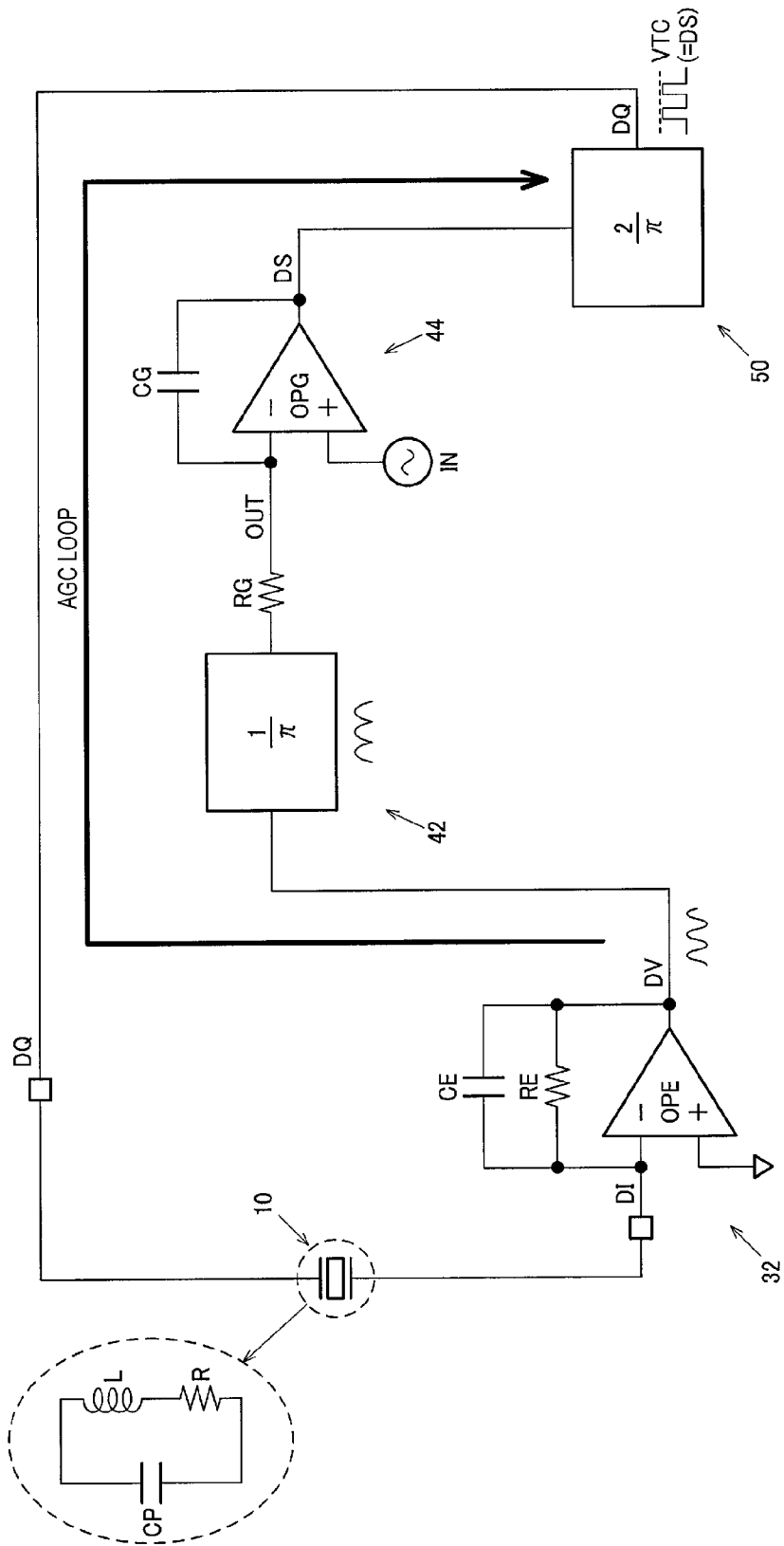
FIG. 6 shows an example of a circuit model of the drive circuit in order to find a closed loop frequency characteristic of AGC.

FIG. 6 shows an example of a circuit model of the drive circuit 30 to find a closed loop frequency characteristic of the AGC. The oscillator 10 of quartz crystal is expressed as an equivalent circuit including an inductor L, a resistor R, and a parasitic capacitance CP. The capacitive component of quartz crystal is omitted.

The amplifier circuit 32 and the integrator 44 are shown as circuit models according to the actual circuits. Meanwhile, the full-wave rectifier 42 is shown as a circuit model having gain of $1/\pi$, and the drive signal output circuit 50 (comparator CP1) is shown as a circuit mode having gain of $4/\pi$(square wave)$\times\frac{1}{2}$(time)$=2/\pi$.

Figure 7:
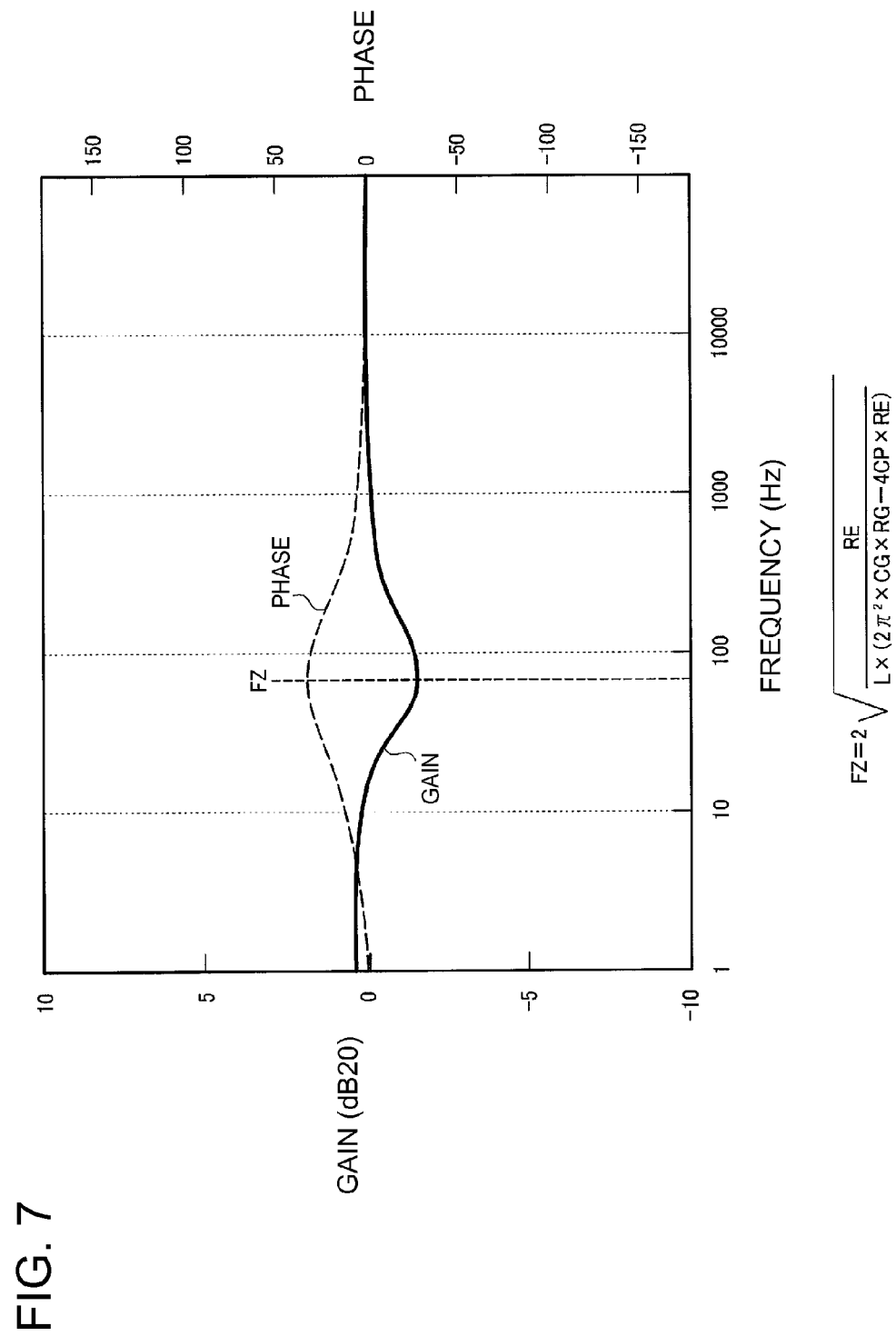
FIG. 7 shows a closed loop frequency characteristic of AGC.

With such circuit models, if a small-amplitude signal IN is inputted to the non-inverting input terminal of the operational amplifier OPG and frequency characteristics of gain and phase of an output signal OUT at the inverting input terminal are found, the result as shown in FIG. 7 is obtained.

Originally, the node of the non-inverting input terminal of IN and the node of the inverting input terminal of OUT are nodes in virtual ground state due to negative feedback. Therefore, gain should be expected to be 0 dB (gain=1).

However, since there is a zero point at a frequency FZ expressed by the equation shown in FIG. 7, the actual gain is not 0 dB. Therefore, the control voltage DS outputted from the integrator 44, that is, a high potential-side voltage VTC of the drive signal DQ changes slightly in an undulating manner at the frequency FZ.

Figure 8A:
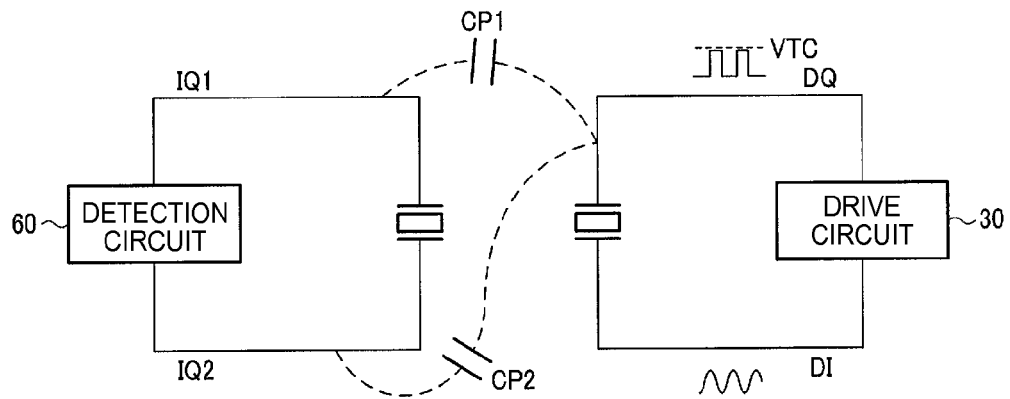
Figure 8B:
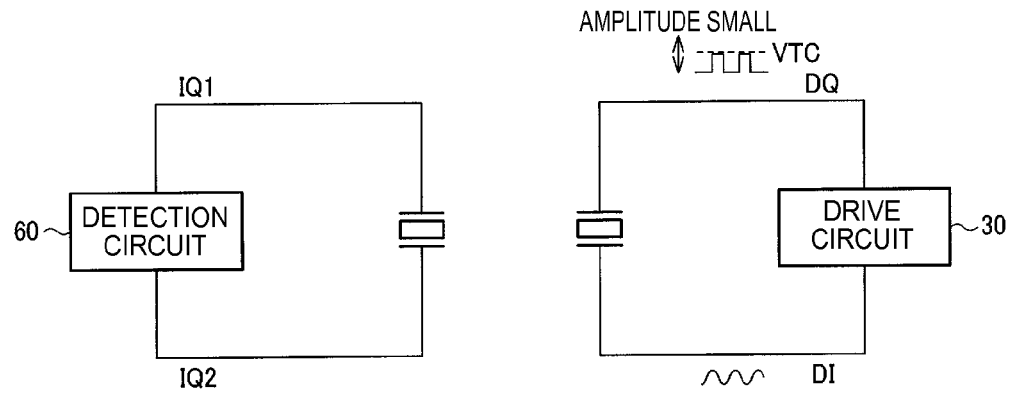
Figure 8C:
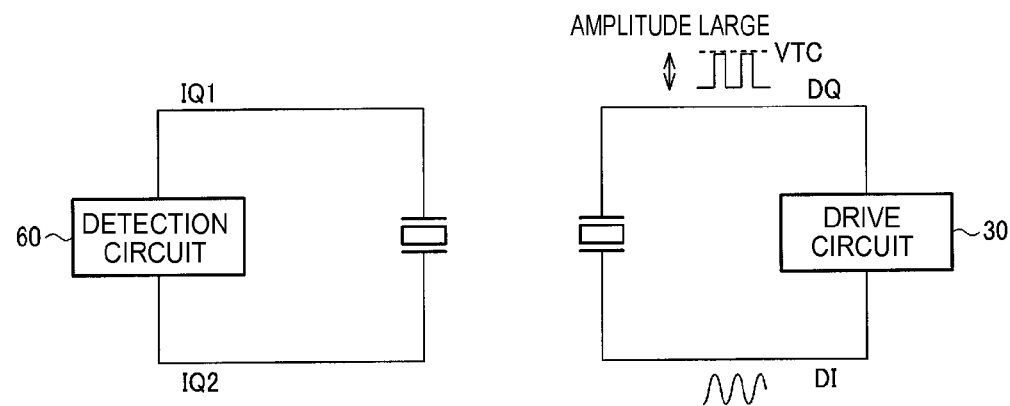

Now, parasitic capacitances CP1, CP2 exist at the drive terminal of the drive circuit 30 and the input terminal of the detection circuit 60, as shown in FIG. 8A, and because of these parasitic capacitances CP1, CP2, an unwanted signal due to so-called electrostatic leakage is generated. If the capacitance values of CP1, CP2 are the same, the unwanted signal resulting from CP1, CP2 can be eliminated by differential amplification by the amplifier circuit 61 of FIG. 2. However, if the capacitance values of CP1, CP2 are different, the unwanted signal cannot be eliminated depending on the differential amplification by the amplifier circuit 61, and therefore the detection performance of the detection device falls. Also, as the high potential-side voltage VTC of the drive signal DQ changes slightly at the low frequency FZ, as shown in FIGS. 8B and 8C, there is a risk that the detection current (electric charge) fluctuates, causing the detection sensitivity to fluctuate. For example, the slight fluctuation at the frequency FZ is frequency-converted with the drive frequency FD of the oscillation loop and thus appears as noise (phase noise) at the frequency of FD±FZ.

In terms of this, according to the embodiment, the AGC loop is switched off and the oscillator 10 is driven by the drive signal DQ based on the setting of the control voltage DS in the on-period. Therefore, the situation where the control voltage DS fluctuates at the frequency FZ can be restrained and hence the occurrence of the above inconvenience due to the slight fluctuation of the control voltage DS can be restrained. The detection performance of the detection device can thus be improved.

5. Phenomenon of Missing Electric Charge

In the embodiment, the switch element SW is off in the off-period of the AGC loop. However, a phenomenon of missing electric charge may occur in the switch element SW that is off.

For example, in the case where the switch element SW is made up of a transistor (MOS transistor), the phenomenon of missing electric charge occurs due to a leakage current from the transistor. Specifically, in FIG. 9, when the switch element SW is switched off, the phenomenon of missing electric charge, of accumulated charge in the capacitor CG, occurs due to a leakage current ILB to the bulk side of the transistor forming the switch element SW and a leakage current ILC to the channel side. As such a phenomenon of missing electric charge occurs, the control voltage DS sampled and held by the integrator 44 changes, generating a problem that the drive current fluctuates. For example, in the circuit configuration of FIG. 4, if the control voltage DS rises because of the phenomenon of missing electric charge, the amplitude of the drive signal DQ increases and the drive current increases with the lapse of time.

Figure 10:
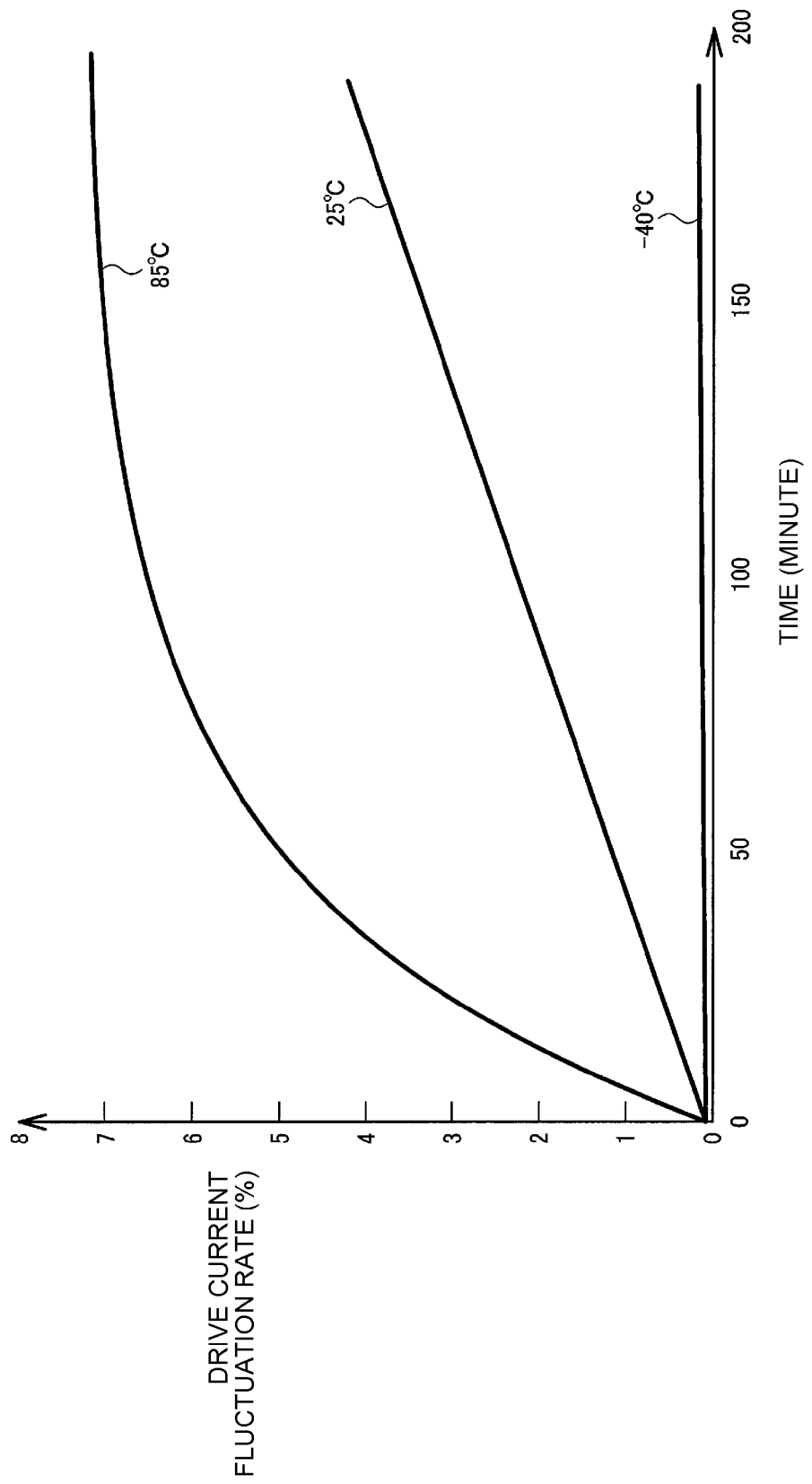
FIG. 10 shows the fluctuation rate of a drive current with the lapse of time in an off-period of the AGC loop.

For example, FIG. 10 shows the fluctuation rate of the drive current in relation to time, at each temperature. As shown in FIG. 10, the drive current increases with the lapse of time. Also, since the leakage current increases as temperature becomes higher, the fluctuation rate of the drive current increases as well.

Figure 11A:
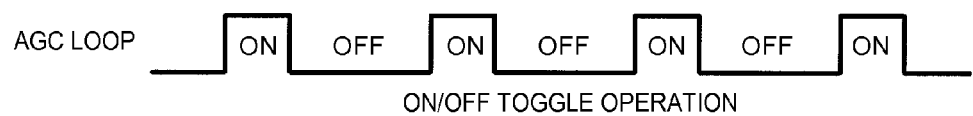
FIGS. 11A and 11B are explanatory views showing an on/off repetition mode and a post-startup completion off mode of the AGC loop.

Thus, in this embodiment, a mode in which the switching on/off of the AGC loop is repeated (hereinafter referred to as an on/off repetition mode, as needed) as shown in FIG. 11A is prepared. According to the on/off repetition mode, even if the drive current fluctuates because of the phenomenon of missing electric charge as shown in FIG. 10 in an off-period of the AGC loop, gain control by the AGC loop works in the next on-period of the AGC loop. Thus, the drive current fluctuating (increasing) in the off-period of the AGC loop returns to a proper current value through the gain control by the AGC loop. Therefore, the influence of the fluctuation in the drive current due to the phenomenon of missing electric charge can be minimized.

For example, in an application such as inertial navigation, a desired signal (angular velocity) needs to be detected from detection signals of the oscillator 10 over a long period of time. Therefore, in such an application, it is desirable that the on/off repetition mode as shown in FIG. 11A is set. Since the fluctuation rate of the drive current with the lapse of time is not very high as shown in FIG. 10, shortening the on/off repetition period of the AGC loop enables minimization of the adverse effect of the fluctuation in the drive current. Also, as described with reference to FIG. 3, as the AGC loop is switched off, the noise component is reduced and the detection performance of the detection device can be improved.

Figure 11B:

Meanwhile, in an application of an electronic apparatus such as a digital camera, it is common for the user to turn on the power of the camera, press the shutter button, and turn the power off without waiting long. Therefore, in such an application, a mode in which the AGC loop is switched on at the time of startup and in which the AGC loop is switched off after the startup is complete (hereinafter referred to as a post-startup completion off mode, as needed) as shown in FIG. 11B is employed.

As the post-startup completion off mode is set, when the power of the electronic apparatus is turned on, the AGC loop is switched on and oscillation startup of the oscillator 10 is started by the drive circuit 30. Thus, AGC control to make the drive current constant is carried out. As the startup period proceeds, the drive current becomes constant, and the timing when the startup of oscillation is determined as complete is reached, the AGC loop is then switched off. For example, in this off-period of the AGC loop, the detection circuit 60 detects a desired signal from a detection signal. Thus, it is possible to detect a desired signal with high detection performance. Then, since it is expected that the power of the electronic apparatus is turned off before long afterwards, the fluctuation in the drive current as shown in FIG. 10 is no longer a big problem.

FIGS. 12A to 12D show examples of register maps in the AGC loop on/off control register.

FIG. 12A shows an example of the setting register for operation modes of the detection device. Setting a register value of AGMODE [1:0] enables setting of a mode in which the AGC loop is constantly on, the on/off repetition mode of FIG. 11A, a mode in which the AGC loop is constantly off, and the post-startup completion off mode of FIG. 11B. For example, by accessing this register via an external interface and setting a register value, the user can set an optimum mode for the application as the operation mode of the detection device.

FIG. 12B shows an example of the register for setting the length of the period for the AGC loop to be switched off from on, in the post-startup completion off mode (FIG. 11B). Setting a register value of AGSTART[1:0] enables setting of how much time it should take for the AGC loop to be switched off from on after the drive current reaches a predetermined current (for example, 20 µApp). That is, setting this register value enables setting of the length of the on-period of the AGC loop in the post-startup completion off mode of FIG. 11B.

FIGS. 12C and 12D show examples of the register for setting the length of the off-period and on-period of the AGC loop in the on/off repetition mode (FIG. 11A). Setting register values of AGOFTM[7:0] and AGONTM[7:0] enables setting of the off-time and on-time of the AGC loop in the on/off repetition mode.

Figure 13:
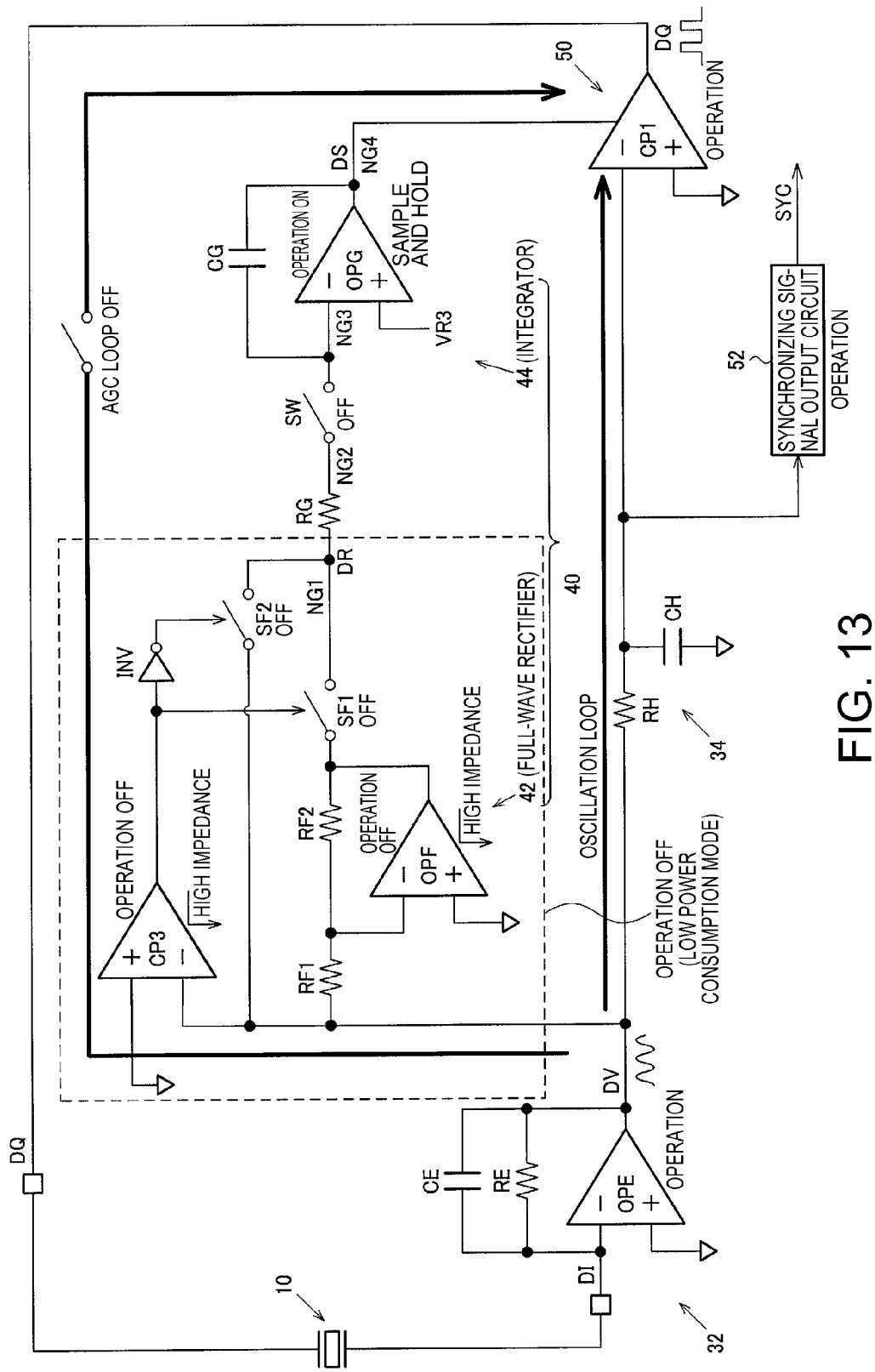
FIG. 13 is an explanatory view showing a technique for restraining adverse effects of a leakage current from the switch element when the AGC loop is off.

Also, in this embodiment, the full-wave rectifier 42 is set to an operation off state (or low power consumption state) in the off-period of the AGC loop, as shown in FIG. 13. The setting of the operation off state is carried out, for example, by the control unit 140.

That is, in the off-period of the AGC loop, since gain control by the AGC loop does not work, the operation of the full-wave rectifier 42 in the off-period leads to unnecessary consumption of power.

In terms of this, according to the embodiment, since the full-wave rectifier 42 is set to the operation off state (low power consumption mode) in the off-period of the AGC loop, such unnecessary consumption of power can be restrained and power saving in the detection device can be achieved.

Figure 9:
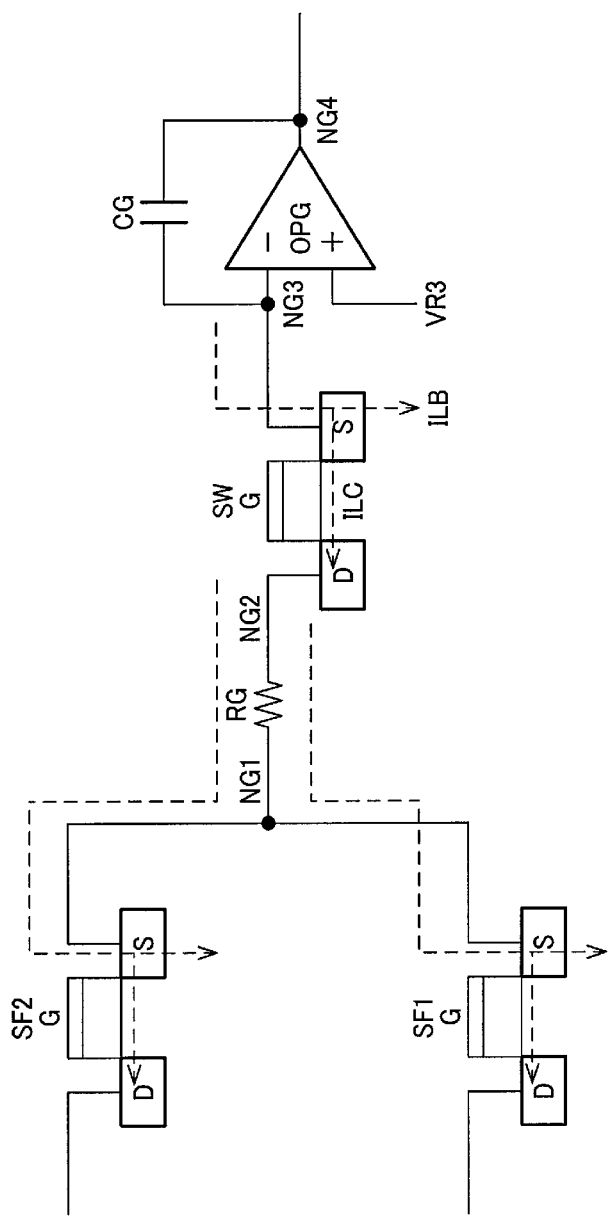
FIG. 9 is an explanatory view of the problem due to a leakage current from a switch element when the AGC loop is off.

The setting of the operation off state of the full-wave rectifier 42 is realized by switching off the operation of the operational amplifier OPF and the comparator CP3 of the full-wave rectifier 42. Specifically, this setting is realized by switching off the bias current of the operational amplifier OPF and the comparator CP3, or the like. As the operation of the operational amplifier OPF and the comparator CP3 is switched off, the impedance as viewed from the output side of the operational amplifier OPF and the comparator CP3 reaches a high impedance state, as shown in FIG. 13. As such a high impedance state is set, the current path through which the leakage current ILC flows in the switch element SW of FIG. 9 is limited and consequently the missing electric charge due to the leakage current ILC is restrained. Therefore, the adverse effect of the missing electric charge is reduced and the fluctuation or the like of the drive current in the off-period of the AGC loop can be restrained. Also, in the off-period of the AGC loop, the full-wave rectifier 42 may be set to the low power consumption mode, instead of the complete operation off state. In the low power consumption mode, setting such as reducing the bias current or the like compared with the time of normal operation is carried out.

Also, in the embodiment, the switch elements SF1, SF2 are off in the off-period of the AGC loop, as shown in FIG. 13.

That is, in FIG. 13, the gain control circuit 40 has the switch elements SF1, SF2 (in a broad sense, second switch elements) between the switch element SW and the output node of the amplifier circuit 32. In this case, in the off-period of the AGC loop, in which the switch element SW is off, the switch elements SF1, SF2 (second switch elements) are switched off, too. That is, in the off-period of the AGC loop, the control unit 140 switches off not only the switch element SW but also the switch elements SF1, SF2 forming the full-wave rectifier 42 on the preceding stage. In short, the switch elements SF1, SF2, which are exclusively switched on/off at the time of full-wave rectifying operation in the on-period of the AGC loop, are both switched off in the off-period of the AGC loop.

As the switch elements SF1, SF2 on the stage preceding the switch element SW are thus switched off, the current path of the leakage current ILC from the switch element SW of FIG. 9 can be limited. Therefore, the missing electric charge due to the leakage current ILC can be restrained. That is, the current path of the leakage current ILC flowing to the channel side in the switch element SW is limited (interrupted) as the switch elements SF1, SF2 are switched off. Thus, the adverse effect of the missing electric charge is reduced and the fluctuation or the like of the drive current in the off-period of the AGC loop can be restrained.

In FIG. 13, the switch elements SF1, SF2 of the full-wave rectifier 42 are effectively utilized to limit the current path of the leakage current ILC from the switch element SW. However, a switch element that is different from the switch elements SF1, SF2 may be separately provided to limit the current path of the leakage current ILC.

Figure 14A:
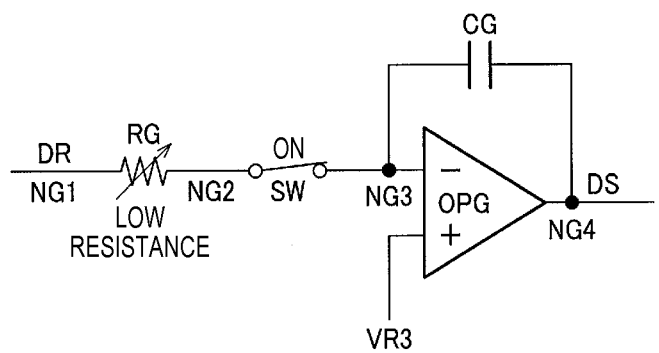
FIGS. 14A and 14B are explanatory views showing a resistance control technique for a resistance element in an integrator.
Figure 14B:
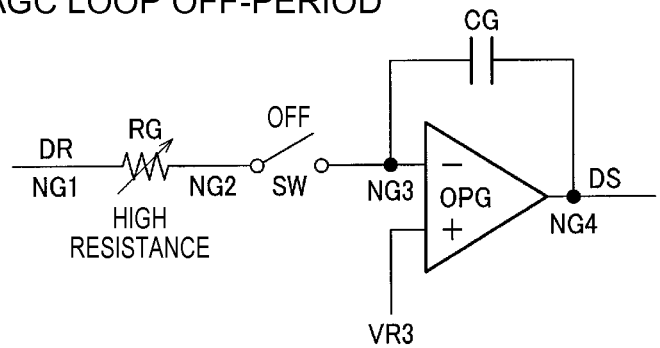

In the embodiment, a resistance element with variable resistance is used as the resistance element RG of the integrator 44, as shown in FIGS. 14A and 14B. In the on-period of the AGC loop, the resistance element RG is set to low resistance (first resistance value), as shown in FIG. 14A. That is, the resistance of the resistance element RG is set to be low under the control of the control unit 140. Meanwhile, in the off-period of the AGC loop, the resistance element RG is set to high resistance (second resistance value that is higher than the first resistance value). That is, the resistance of the resistance element RG is set to be high under the control of the control unit 140.

For example, in the on-period of the AGC loop, since the resistance element RG is set to low resistance, responsiveness of the integration processing by the integrator 44 can be enhanced. Meanwhile, in the off-period of the AGC loop, since the resistance element RG is set to high resistance, the current path of the leakage current ILC from the switch element SW can be limited further, compared with the case where the resistance element RG has low resistance. Therefore, the missing electric charge due to the leakage current ILC can be restrained.

Figures 15A, 15B, 15C:
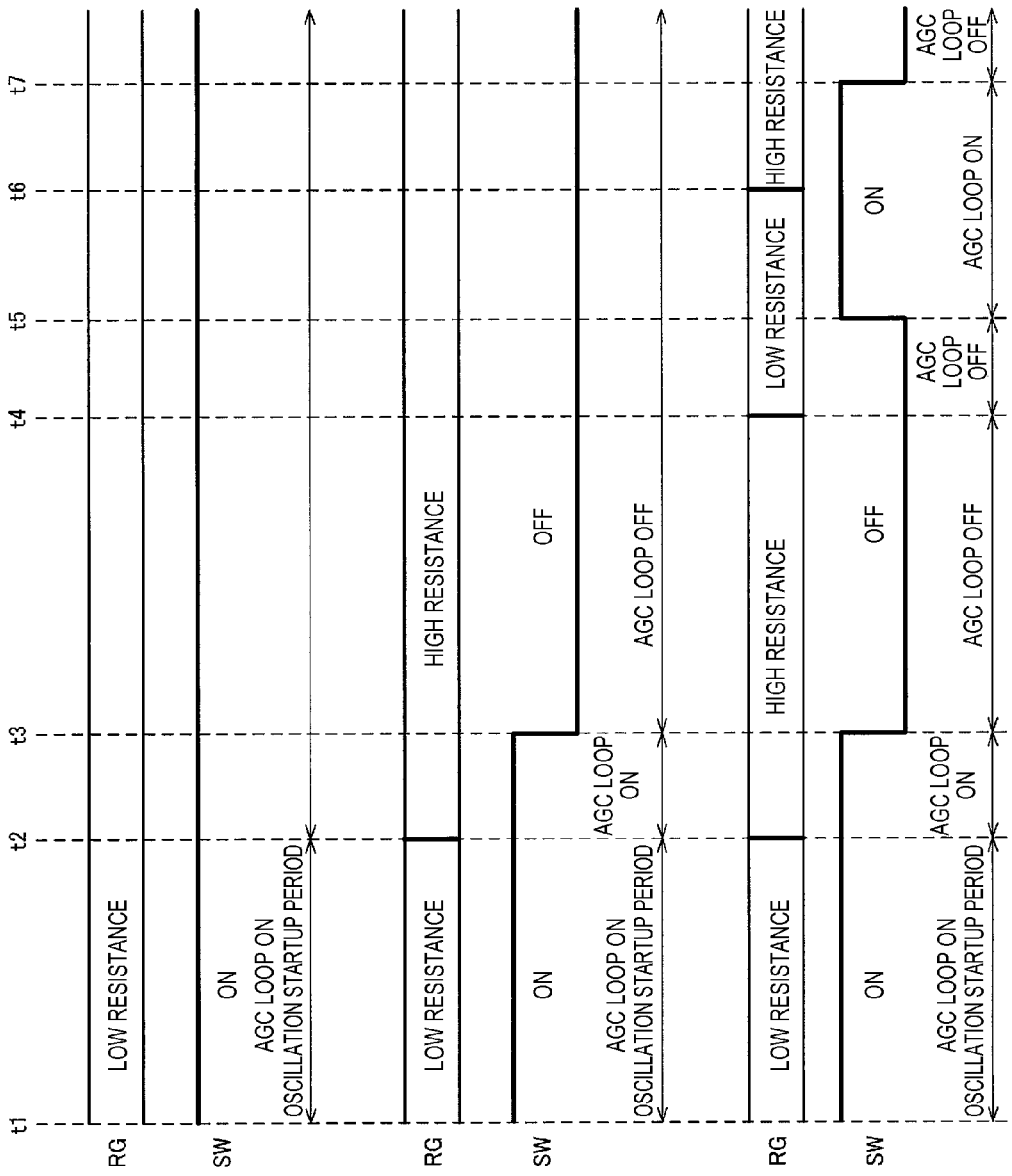
FIGS. 15A to 15C are explanatory views showing detailed examples of the resistance control technique for the resistance element in the integrator.

FIGS. 15A to 15C are explanatory views showing detailed examples of the resistance control technique in this embodiment. FIG. 15A shows an example of the case where the mode in which the AGC loop is constantly on is set in the register map of FIG. 12A. In this case, in the oscillation startup period, the switch element SW is on and therefore the AGC loop is on, and the resistance element RG is set to low resistance. Even after the oscillation startup period is complete, the state where the AGC loop is on and where the resistance element RG has low resistance continues.

FIG. 15B shows an example of the case where the post-startup completion off mode is set in the register map of FIG. 12A. First, in the oscillation startup period from the timing t1 to the timing t2, the switch element SW is on and therefore the AGC loop is on, and the resistance element RG is set to low resistance. At the timing t2, the resistance element RG is switched from low resistance to high resistance. At the subsequent timing t3, the switch element SW is switched off from on and therefore the AGC loop is switched off from on. That is, the resistance element RG is switched from low resistance to high resistance at the timing t2, which precedes the timing t3 when the AGC loop is switched off from on.

FIG. 15C shows an example of the case where the on/off repetition mode is set in the register map of FIG. 12A. First, in the oscillation startup period from the timing t1 to the timing t2, the switch element SW is on and therefore the AGC loop is on, and the resistance element RG is set to low resistance. At the timing t2, the resistance element RG is switched from low resistance to high resistance. At the subsequent timing t3, the switch element SW is switched off from on and therefore the AGC loop is switched off from on. Next, at the timing t4, the resistance element RG is switched from high resistance to low resistance. At the subsequent timing t5, the switch element SW is switched on from off and therefore the AGC loop is switched on from off. That is, the resistance element RG is switched from high resistance to low resistance at the timing t4, which precedes the timing t5 when the AGC loop is switched on from off.

As described above, the on/off control of the switch element SW is carried out by the control unit 140. However, the timing of the on/off control varies. For example, though the control unit 140 controls the on/off state of the switch element SW, using a clock signal (synchronizing signal SYC) or the like based on the oscillation of the oscillator 10 (quartz crystal oscillation), the amount of delay of circuit elements varies depending on temperature or the like and therefore the timing of the on/off control of the switch element SW fluctuates as well.

At the timing t3 when the switch element SW is switched off from on in FIGS. 15B and 15C, the control voltage DS used in the off-period of the AGC loop is sampled and held by the integrator 44. Therefore, if the timing t3 fluctuates in terms of time, the electric potential of the control voltage DS that is sampled and held fluctuates as well. As the electric potential of the control voltage DS fluctuates, the drive current in the off-period of the AGC loop fluctuates as well.

Here, in the integrator 44 of FIGS. 14A and 14B, if the capacitor CG has a constant capacitance value, the fluctuation in the electric potential at the charge accumulation node NG3 becomes smaller as the resistance of the resistance element RG becomes higher. Therefore, in FIGS. 15B and 15C, if the resistance element RG is switched from low resistance to high resistance at the timing t2, the fluctuation in the electric potential at the charge accumulation node NG3 can be minimized at the subsequent timing t3 when the switch element SW is switched off from on. As the fluctuation in the electric potential at the charge accumulation node NG3 can be minimized in this way, the fluctuation in the electric potential of the control voltage DS that is sampled and held can be restrained and the fluctuation (amount of error) in the drive current in the off-period of the AGC loop can be restrained as well. That is, the fluctuation in the drive current due to the shift of the timing t3 when the switch element SW is switched off from on, can be minimized.

Figure 16A:
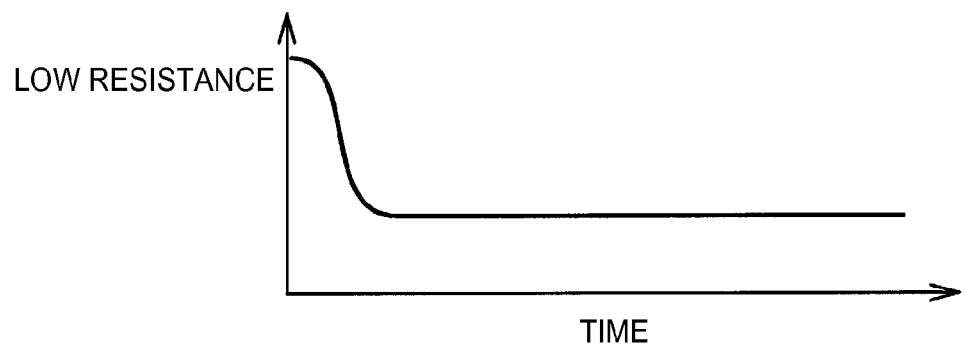
FIGS. 16A and 16B show the relation between the magnitude of resistance of the resistance element in the integrator and the convergence time of AGC.
Figure 16B:
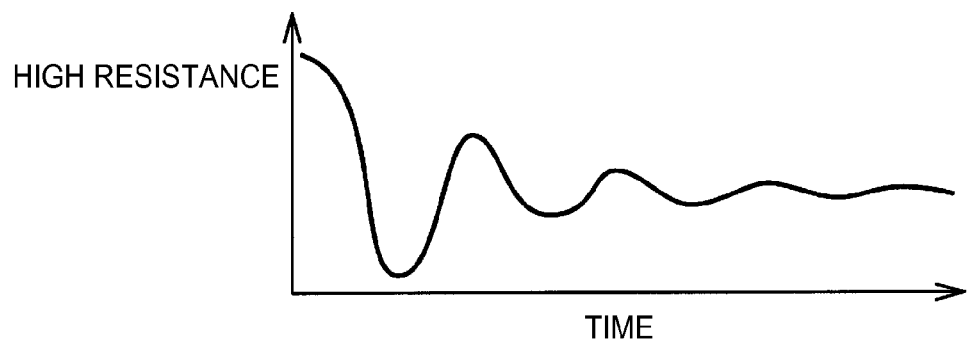

FIGS. 16A and 16B show the relation between the magnitude of the resistance of the resistance element RG in the integrator 44 and the convergence time of AGC. FIG. 16A shows the case where the resistance element RG has low resistance. FIG. 16B shows the case where the resistance element RG has high resistance. As shown in FIGS. 16A and 16B, the response speed of AGC becomes slower and the convergence time of AGC becomes longer as the resistance of the resistance element RG in the integrator 44 becomes higher.

Thus, in FIGS. 15B and 15C, the resistance element RG is switched from high resistance to low resistance at the timing t4, which precedes the timing t5 when the switch element SW is switched on from off. Thus, when the AGC loop is switched on from off at the timing t5 and the gain control by the AGC loop to make the drive current constant is started, the convergence time of AGC can be reduced as shown in FIG. 16A because the resistance element RG is set to low resistance. That is, the time for the drive current to become constant can be shortened and the convergence operation of AGC can be speeded up.

6. Detection Circuit

Figure 17:
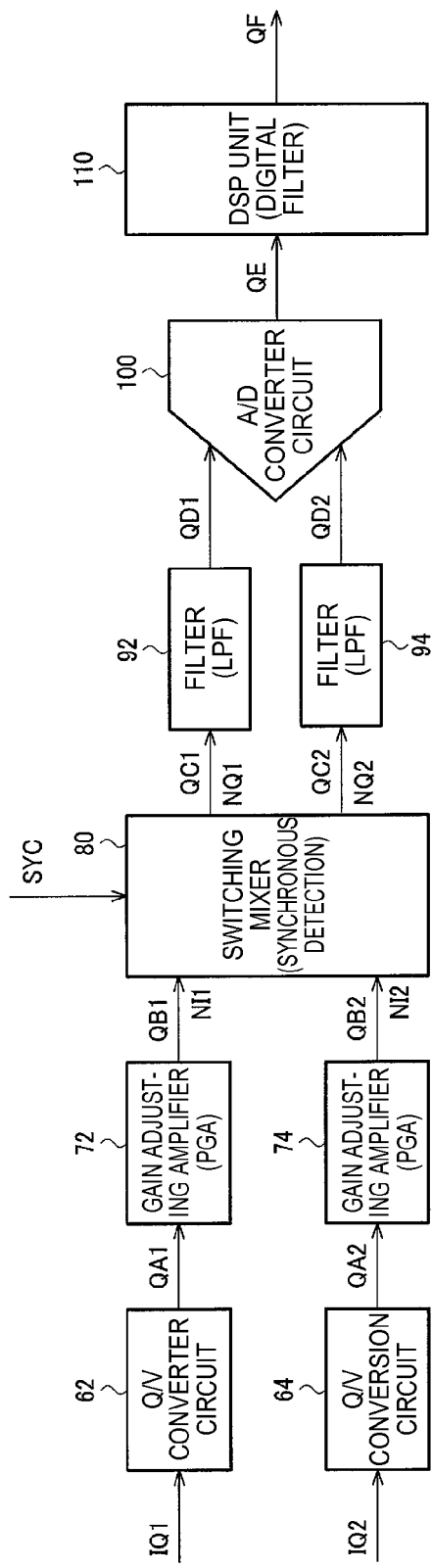
FIG. 17 shows an example of the configuration of a detection circuit.

FIG. 17 shows example of the detailed configuration of the detection circuit 60. FIG. 17 shows an example of the detection circuit 60 of a fully differential switching mixer system.

As shown in FIG. 17, the detection circuit 60 of a fully differential switching mixer system includes first and second Q/V converter circuits 62, 64, first and second gain adjusting amplifiers 72, 74, a switching mixer 80, first and second filters 92, 94, an A/D converter circuit 100, and a DSP unit 110 (digital signal processing unit).

Differential first and second detection signals IQ1, IQ2 from the oscillator 10 are inputted to the Q/V converter circuits 62, 64 (charge-voltage converter circuit). The Q/V converter circuits 62, 64 convert the electric charge (current) generated by the oscillator 10 to voltage.

The gain adjusting amplifiers 72, 74 adjust the gain of output signals QA1, QA2 from the Q/V converter circuits 62, 64 and amplify the signals QA1, QA2. The gain adjusting amplifiers 72, 74 are so-called programmable gain amplifiers and amplify the signals QA1, QA2 with the gain that is set by the control unit 140. For example, the gain adjusting amplifiers 72, 74 amplify the signals to signals having an amplitude that matches the voltage conversion range of the A/D converter circuit 100.

The switching mixer 80 is a mixer which carries out synchronous detection of the differential on the basis of the synchronizing signal SYC from the drive circuit 30. Specifically, in the switching mixer 80, the output signal QB1 from the gain adjusting amplifier 72 is inputted to a first input node NI1, and the output signal QB2 from the gain adjusting amplifier 74 is inputted to a second input node NI2. Then, synchronous detection of the differential is carried out on the basis of the synchronizing signal SYC from the drive circuit 30, and differential first and second output signals QC1, QC2 are outputted to first and second output nodes NQ1, NQ2. By the switching mixer 80, an unwanted signal such as noise (1/f noise) generated in the preceding circuits (Q/V converter circuits, gain adjusting amplifiers) is frequency-converted to a high frequency band. Also, a desired signal that is a signal corresponding to a Coriolis force is inserted in the DC signal.

The first output signal QC1 from the first output node NQ1 of the switching mixer 80 is inputted to the filter 92. The second output signal QC2 from the second output node NQ2 of the switching mixer 80 is inputted to the filter 94.

These filters 92, 94 are, for example, low-pass filters having such a frequency characteristic as to eliminate (attenuate) an unwanted signal and transmit a desired signal. For example, the unwanted signal such as 1/f noise that is frequency-converted to a high frequency band by the switching mixer 80 is eliminated by the filters 92, 94. Also, the filters 92, 94 are passive filters made up of passive elements such as a resistance element and a capacitor, without using an operational amplifier.

The A/D converter circuit 100 receives an output signal QD1 from the filter 92 and an output signal QD2 from the filter 94 and carries out differential A/D conversion. Specifically, the A/D converter circuit 100 samples the output signals QD1, QD2 and carries out A/D conversion, using the filters 92, 94 as anti-aliasing filters (pre-filters). In this embodiment, the output signal QD1 from the filter 92 and the output signal QD2 from the filter 94 are inputted to the A/D converter circuit 100 without passing through any active element. As the A/D converter circuit 100, A/D converter circuits of various types, for example, delta-sigma type or sequential comparison type, can be employed. If a delta-sigma type is employed, an A/D converter circuit which has, for example, the functions of CDS (correlated double sampling) and chopper in order to reduce 1/f noise, and which is made up of a quadratic delta-signal modulator, for example, can be used.

The DSP (digital signal processing) unit 110 carries out various kinds of digital signal processing. For example, the DSP unit 110 carries out digital filter processing for band limitation corresponding to the application of a desired signal, and digital filter processing to eliminate noise generated by the A/D converter circuit 100 or the like. The DSP unit 110 also carries out digital correction processing such as gain correction (sensitivity adjustment) and offset correction.

The detection circuit 60 of FIG. 17 employs a fully differential switching mixer system. That is, the differential detection signals IQ1, IQ2 from the oscillator 10 are subjected to signal amplification and gain adjustment by the Q/V converter circuits 62, 64 and the gain adjusting amplifiers 72, 74, and inputted to the switching mixer 80 as the differential signals QB1, QB2. These differential signals QB1, QB2 are subjected to synchronous detection processing by the switching mixer 80 in which the unwanted signal is frequency-converted to a high frequency band. Then, the unwanted signal that is frequency-converted to the high frequency band is eliminated by the filters 92, 94 and the resulting differential signals QD1, QD2 are inputted to the A/D converter circuit 100, where differential A/D conversion is carried out.

According to the detection circuit 60 of such a fully differential switching mixer system, the 1/f noise or the like generated in the Q/V converter circuits 62, 64 and the gain adjusting amplifiers 72, 74 is eliminated through the frequency conversion by the switching mixer 80 and by the low-pass filter characteristic of the filters 92, 94. The switching mixer 80, which does not generate gain but generates less noise (generates no 1/f noise), and the filters 92, 94 made up of low-noise passive elements are provided between the gain adjusting amplifiers 72, 74 and the A/D converter circuit 100. Thus, since the noise generated in the Q/V converter circuits 62, 64 and the gain adjusting amplifiers 72, 74 is eliminated and the noise generated in the switching mixer 80 and the filters 92, 94 is minimized, the signals QD1, QD2 in the low-noise state can be inputted to the A/D converter circuit 100 and thus A/D-converted. Moreover, since the signals QD1, QD2 can be A/D-converted as differential signals, the S/N ratio can be improved further, compared with the case where single-ended signals are A/D-converted.

It should be noted that the detection circuit 60 in this embodiment is not limited to the fully differential switching mixer system shown in FIG. 17. For example, detection circuits 60 of various systems such as a direct sampling system shown in FIG. 18A and an analog synchronous detection system shown in FIG. 18B can be employed.

Figure 18A:
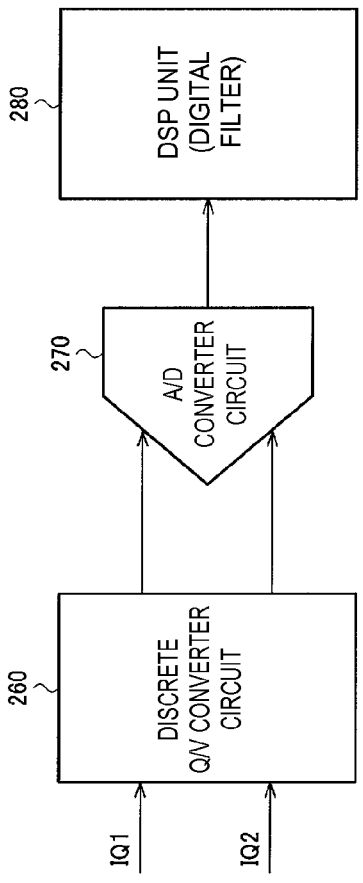
FIGS. 18A and 18B show other configuration examples of the detection circuit.

The detection circuit 60 of the direct sampling system of FIG. 18A has a discrete Q/V converter circuit 260, an A/D converter circuit 270, and a DSP unit 280. The direct sampling system is an advantageous configuration in terms of smaller circuit scale. However, since no anti-aliasing filter is provided on the stage preceding the A/D converter circuit 270, there is a problem that deterioration in performance due to folding noise is unavoidable. Meanwhile, in the fully differential switching mixer system of FIG. 17, since the Q/V converter circuits 62, 64 are continuous charge-voltage converter circuits having feedback resistance elements, the problem of deterioration in performance due to folding noise generated in the direct sampling system can be prevented and there is an advantage in that detection processing with low noise can be realized with a small-scale circuit configuration.

Figure 18B:
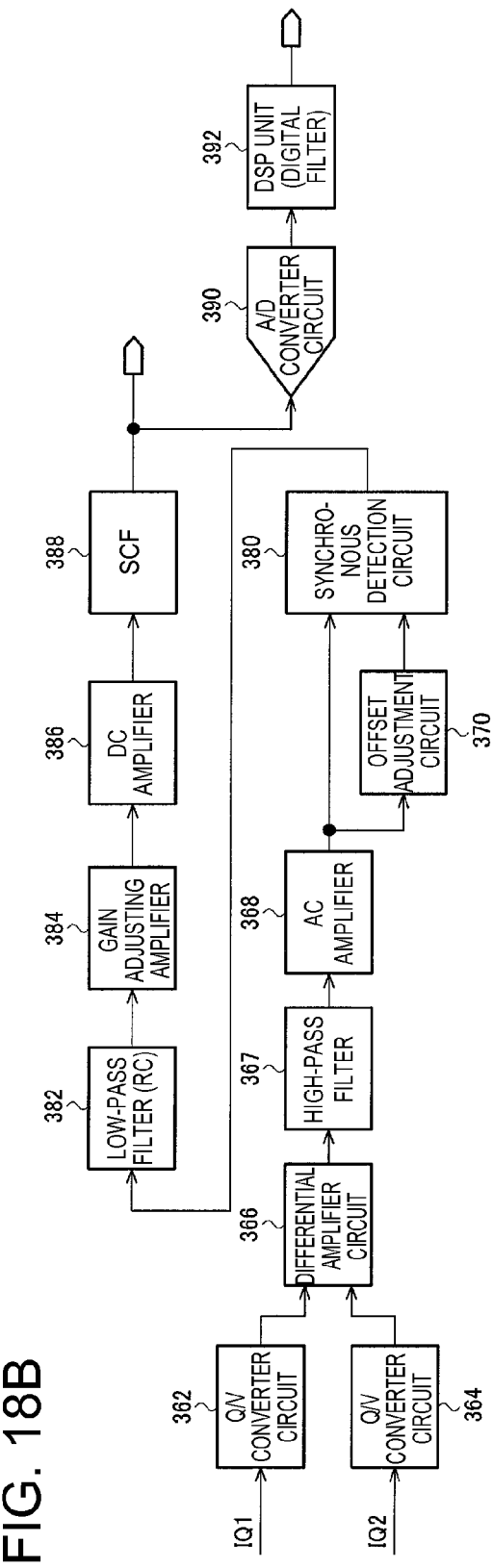

The detection circuit 60 of the analog synchronous detection system of FIG. 18B has Q/V converter circuits 362, 364, a differential amplifier circuit 366, a high-pass filter 367, an AC amplifier 368, an offset adjusting circuit 370, a synchronous detection circuit 380, a low-pass filter 382, a gain adjusting amplifier 384, a DC amplifier 386, and an SCF 388 (switched capacitor filter). Also, for example, external circuits of the detection device, an A/D converter circuit 390 and a DSP unit 392 (digital filter) are provided.

This analog synchronous detection system is advantageous in that, for example, the noise characteristic can be improved by having large gain of the signal in the detection circuit 60. However, this system has a problem that the use of a large number of circuit blocks increases the circuit scale and that power consumption becomes excessive because of the large number of analog circuit blocks, which consume a large amount of current. Meanwhile, the fully differential switching mixer system of FIG. 17 is advantageous in that this system uses a smaller number of circuit blocks than the analog synchronous detection system and therefore can easily realize reduction in circuit scale and reduction in power consumption. Also, in the fully differential switching mixer system, the differential signals IQ1, IQ2 from the oscillator 10 are subjected to gain adjustment, synchronous detection processing and filter processing and are inputted to the A/D converter circuit 100 and thus A/D-converted, while these signals remain differential signals. Therefore, this configuration is advantageous in terms of noise reduction, compared with the analog synchronous detection system, in which filter processing, synchronous detection processing, gain adjustment processing and the like are carried out on single-ended signals.

The gyro sensor 510 (sensor) in this embodiment can be incorporated in various moving objects, for example, an automobile, aircraft, motorcycle, bicycle, ship or the like. A moving object is a device or apparatus which has, for example, a drive mechanism such as an engine or motor, a steering mechanism such as a steering wheel or steering gear, and various electronic devices, and which moves on the ground, in the air, or at sea.

Figure 19:
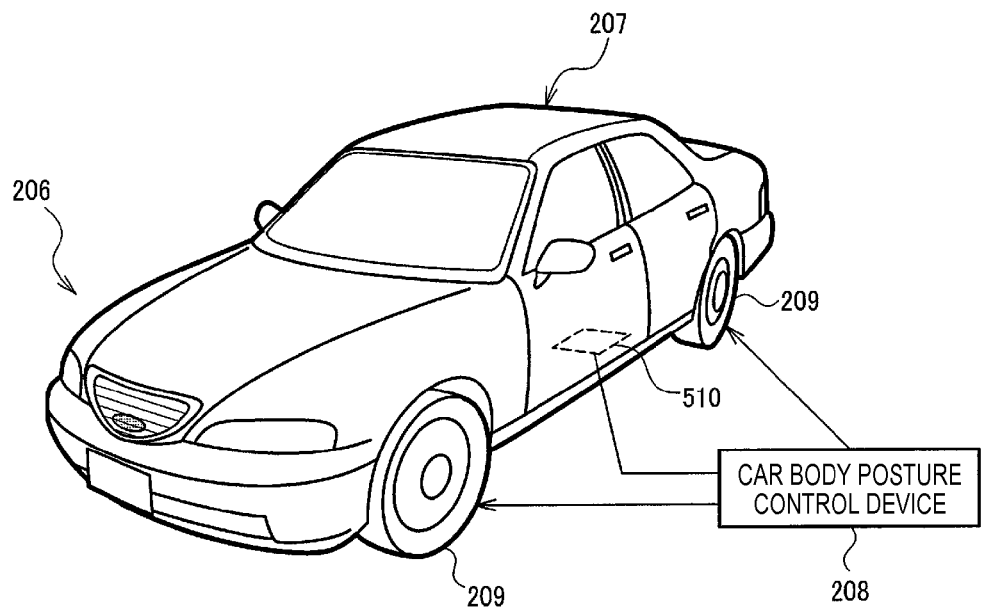
FIG. 19 is a conceptual view schematically showing the configuration of an automobile as a specific example of a moving object.

FIG. 19 schematically shows an automobile 206 as a specific example of the moving object. The gyro sensor 510 having the oscillator 10 and the detection device 20 is incorporated in the automobile 206. The gyro sensor 510 can detect the posture of a car body 207. A detection signal from the gyro sensor 510 can be supplied to a car body posture control device 208. The car body posture control device 208 can control the hardness/softness of the suspension and the braking on individual wheels 209, for example, according to the posture of the car body 207. Also, such posture control can be utilized in various moving objects such as a two-legged walking robot, aircraft, or helicopter. To realize the posture control, the gyro sensor 510 can be incorporated therein.

The embodiment is described above in detail. However, a person skilled in the art will readily understand that a number of modifications can be made without substantially departing from the new matters and effects of the invention. Therefore, all such modifications are considered as included in the scope of the invention. For example, a term (gyro sensor, oscillator, angular velocity information or the like) that is described along with a different term with a broader meaning or the same meaning (sensor, physical quantity transducer, physical quantity or the like) at least once in the specification or drawings can be replaced with the different term at any part of the specification or drawings. Also, the configurations of the detection device, the sensor, the electronic apparatus and the moving object, and the structure or the like of the oscillator are not limited to those described in the embodiment and various modifications can be made thereto.

The entire disclosure of Japanese Patent Application No. 2013-231341, filed Nov. 7, 2013 is expressly incorporated by reference herein.

What is claimed is:

1. A detection device comprising:
   a drive circuit which receives a feedback signal from a physical quantity transducer and drives the physical quantity transducer;
   a detection circuit which receives a detection signal from the physical quantity transducer and detects a desired signal; and
   a control unit which controls switching on/off of an AGC (automatic gain control) loop in the drive circuit;
   wherein the drive circuit outputs a drive signal to the physical quantity transducer during an off-period of the AGC loop, wherein the drive signal is based on a control voltage that is set by the AGC loop during an on-period of the AGC loop,
   wherein the drive circuit includes:
     an amplifier circuit which amplifies the feedback signal;
     a drive signal output circuit which outputs the drive signal on the basis of the signal amplified by the amplifier circuit; and
     a gain control circuit including an integrator which outputs the control voltage to control the amplitude of the drive signal, to the drive signal output circuit,
   wherein the integrator includes:
     an operational amplifier;
     a capacitor provided between an output node of the operational amplifier and a node of an inverting input terminal of the operational amplifier; and
     a resistance element having one end electrically connected to an input node of the integrator,
   a switch element provided between the other end of the resistance element and the inverting input terminal of the operational amplifier, the control unit controls switching on/off of the switch element and thereby controls the switching on/off of the AGC loop, the gain control circuit outputs the control voltage that is sampled and held in the integrator as the switch element is switched off, to the drive signal output circuit during the off-period of the AGC loop, and the drive signal output circuit outputs the drive signal based on the control voltage that is sampled and held, to the physical quantity transducer and thus drives the physical quantity transducer during the off-period of the AGC loop, wherein the resistance element is a resistance element with variable resistance, and during the on-period of the AGC loop, the resistance element is set to a first resistance value, and during the off-period of the AGC loop, the resistance element is set to a second resistance value that is higher than the first resistance value.

2. The detection device according to claim 1, wherein the resistance element is switched from the first resistance value to the second resistance value at a timing before a timing when AGC loop is switched off from on.

3. The detection device according to claim 2, wherein the resistance element is switched from the second resistance value to the first resistance value at a timing before a timing when AGC loop is switched on from off.

4. The detection device according to claim 1, wherein the gain control circuit includes a full-wave rectifier which performs full-wave rectification of an output signal from the amplifier circuit and outputs the full-wave-rectified signal to the integrator, and during the off-period of the AGC loop, the full-wave rectifier is set to an operation off state or low power consumption mode.

5. The detection device according to claim 1, wherein the drive circuit includes:
   an amplifier circuit which amplifies the feedback signal;
   a drive signal output circuit which outputs the drive signal on the basis of the signal amplified by the amplifier circuit; and
   a gain control circuit which outputs the control voltage to the drive signal output circuit and controls an amplitude of the drive signal,
the gain control circuit samples and holds the control voltage that is set in the on-period of the AGC loop, and outputs the control voltage that is sampled and held to the drive signal output circuit in the off-period of the AGC loop, and
the drive signal output circuit outputs the drive signal based on the control voltage that is sampled and held, to the physical quantity transducer and thus drives the physical quantity transducer in the off-period of the AGC loop.

6. The detection device according to claim 1, further comprising a register unit including a control register for on/off control of the AGC loop, wherein the control unit performs on/off control of the AGC loop on the basis of a setting of the control register.

7. The detection device according to claim 6, wherein the register unit includes a setting register for a mode in which switching on/off of the AGC loop is repeated, as the control register.

8. The detection device according to claim 6, wherein the register unit includes a setting register for a mode in which the AGC loop is switched on at the time of startup and is switched off after the startup is complete, as the control register.

9. The detection device according to claim 6, wherein the register unit includes a register which sets at least one of length information of the on-period of the AGC loop and length information of the off-period of the AGC loop, as the control register.

10. A sensor comprising:
    the detection device according to claim 1; and
    the physical quantity transducer.

11. An electronic apparatus comprising the detection device according to claim 1.

12. A moving object comprising the detection device according to claim 1.

13. A detection device comprising:
    a drive circuit which receives a feedback signal from a physical quantity transducer and drives the physical quantity transducer;
    a detection circuit which receives a detection signal from the physical quantity transducer and detects a desired signal; and
    a control unit which controls switching on/off of an AGC (automatic gain control) loop in the drive circuit;
    wherein the drive circuit outputs a drive signal to the physical quantity transducer during an off-period of the AGC loop, wherein the drive signal is based on a control voltage that is set by the AGC loop during an on-period of the AGC loop,
    wherein the drive circuit includes:
        an amplifier circuit which amplifies the feedback signal;
        a drive signal output circuit which outputs the drive signal on the basis of the signal amplified by the amplifier circuit; and
        a gain control circuit which outputs the control voltage to the drive signal output cicuit and controls an amplitude of the drive signal, and
    the control unit controls switching on/off of a switch element provided in a path of the AGC loop in the gain control circuit and thereby controls the switching on/off of the AGC loop,
    wherein the gain control circuit includes a second switch element provided between the switch element and an output node of the amplifier circuit, and
    during the off-period of the AGC loop, the second switch element is off.

* * * * *